(12) United States Patent
Zhang et al.

(10) Patent No.: US 10,341,201 B2
(45) Date of Patent: Jul. 2, 2019

(54) CROSS-DOMAIN ORCHESTRATION OF SWITCH AND SERVICE FUNCTIONS

(71) Applicant: Fujitsu Limited, Kawasaki-shi, Kanagawa (JP)

(72) Inventors: Qiong Zhang, Plano, TX (US); Xi Wang, Murphy, TX (US); Paparao Palacharla, Richardson, TX (US); Tadashi Ikeuchi, Plano, TX (US)

(73) Assignee: FUJITSU LIMITED, Kawasaki (JP)

( * ) Notice: Subject to any disclaimer, the term of this patent is extended or adjusted under 35 U.S.C. 154(b) by 185 days.

(21) Appl. No.: 15/423,134

(22) Filed: Feb. 2, 2017

(65) Prior Publication Data

US 2018/0034714 A1 Feb. 1, 2018

Related U.S. Application Data

(60) Provisional application No. 62/368,694, filed on Jul. 29, 2016.

(51) Int. Cl.
*H04L 12/24* (2006.01)
*H04L 29/08* (2006.01)
*H04L 12/911* (2013.01)

(52) U.S. Cl.
CPC ...... *H04L 41/5096* (2013.01); *H04L 41/0806* (2013.01); *H04L 41/12* (2013.01); *H04L 47/82* (2013.01); *H04L 67/10* (2013.01); *H04L 67/12* (2013.01); *H04L 67/327* (2013.01)

(58) Field of Classification Search
CPC ......... H04L 51/04; H04L 51/34; H04L 51/10; H04L 51/20; H04L 67/22; H04N 21/482; H04N 21/4532; H04N 21/84; H04N 21/44222; H04N 21/472; G06F 13/00
See application file for complete search history.

(56) References Cited

U.S. PATENT DOCUMENTS

| | | | |
|---|---|---|---|
| 2013/0343399 A1* | 12/2013 | Kandula | G06F 9/5077 370/412 |
| 2016/0212017 A1* | 7/2016 | Li | H04L 41/20 |
| 2017/0346704 A1* | 11/2017 | Strijkers | G06F 9/5005 |

OTHER PUBLICATIONS

Sahel Sahhaf, Network service chaining with efficient network function mapping based on service decompositions, 2015, IEEE, 978-1-4799-7899-1/15 (Year: 2015).*

(Continued)

*Primary Examiner* — Ranodhi Serrao
(74) *Attorney, Agent, or Firm* — Baker Botts L.L.P.

(57) ABSTRACT

In one or more embodiments, one or more systems, methods, and/or processes may determine one or more auxiliary edges that bypass at least one vertex of vertices that represent physical nodes of a network domain; evaluate at least one edge, that includes the one or more auxiliary edges and that interconnect the vertices, to evaluate a portion of the vertices that excludes the at least one vertex that was bypassed to identify at least one vertex that is associated with at least one service function of a service function chain request specifying service functions to be performed via at least a portion of physical nodes of network domains; and configure a first physical node of the physical nodes of the network domain and associated with the at least one vertex that is associated with the at least one service function to process data via the at least one service function.

17 Claims, 20 Drawing Sheets

(56) References Cited

OTHER PUBLICATIONS

Zhang, Qiong, et al. "Vertex-centric computation of service function chains in multi-domain networks." NetSoft Conference and Workshops (NetSoft), 2016 IEEE; 8 pages.

Vaishnavi, Ishan, et al.. "Recursive, hierarchical embedding of virtual infrastructure in multi-domain substrates." Network Softwarization (NetSoft), 2015 1st IEEE Conference on; 9 pages.

Houidi, Ines, et al. "Virtual network provisioning across multiple substrate networks." Computer Networks 55.4 (Dec. 19, 2010): 1011-1023; 14 pages.

Xin, Yufeng, et al. "Embedding virtual topologies in networked clouds." Proceedings of the 6th International Conference on Future Internet Technologies. ACM, 2011; 4 pages.

Dietrich, David, et al. "Multi-domain virtual network embedding with limited information disclosure." IFIP Networking Conference. IEEE, 2013; 9 pages.

Chowdhury, Mosharaf, et al. "Polyvine: policy-based virtual network embedding across multiple domains." Proceedings of the second ACM SIGCOMM workshop on Virtualized infrastructure systems and architectures. ACM, 2010; 8 pages.

G. Malewicz, et al., "Pregel: a system for large-scale graph processing," in Proc. ACM SIGMOD, New York, NY, 2010; 11 pages.

Zhang, Qiong, et al. "Distributed Service Orchestration: Interweaving Switch and Service Functions Across Domains." 2016 IEEE; 6 pages.

Tian, Yuanyuan, et al. "From think like a vertex to think like a graph." Proceedings of the VLDB Endowment 7.3 (2013): 193-204; 12 pages.

McCune, Robert Ryan, et al. "Thinking like a vertex: a survey of vertex-centric frameworks for large-scale distributed graph processing." ACM Computing Surveys (CSUR) 48.2 (Jul. 17, 2015): 25; 32 pages.

\* cited by examiner

Superstep 0

Superstep 2

*Superstep 3*

CROSS-DOMAIN ORCHESTRATION OF SWITCH AND SERVICE FUNCTIONS

PRIORITY CLAIM

The Present application claims the benefit of priority from U.S. Provisional Patent Application Ser. No. 62/368,694, filed 29 Jul. 2016, entitled "DISTRIBUTED SERVICE ORCHESTRATION IN MULTI-NETWORK DOMAINS", which is hereby incorporated by reference for all purposes.

BACKGROUND

Field of the Disclosure

The present disclosure relates generally to network function virtualization and, more particularly, to systems and methods for performing service function chaining in multi-network domains.

Description of the Related Art

Emerging network applications, such as cloud and big data, may involve joint consideration of IT resources residing within multiple domains within one or more data centers (DCs). Network function virtualization (NFV) can be used to virtualize network functions and migrate them from devices that are built for a single, specific purpose to multi-purpose virtual machines, which may reduce service deployment costs and improve service flexibility. As more service functions move to virtual machines in geographically distributed data centers and as more individually-managed Networks-on-Demand are enabled by software defined networking (SDN) technology, end-to-end network services may implement various mechanisms to coordinate resources across multi-network domains. For example, a network service may traverse one or more consumer broadband networks, mobile backhaul networks, mobile packet core networks, and/or virtual private networks.

Traditional distributed routing protocols typically compute network paths without considering the availability of service functions and virtual machines at the individual network nodes. A hybrid architecture (e.g., one with geographically distributed orchestrators that replicate a global view of service functions, virtual machines, and networks) can lead to additional challenges, such as managing the global network state, maintaining the confidentiality of various network domains, and managing high computation complexity on a large-scale global view. An approach using path-computation element (PCE)-based multi-domain heuristics to map virtual optical network requests would typically require a parent PCE to compute all possible inter-domain paths. Furthermore, mapping a single virtual link would typically require signaling along all possible inter-domain paths, which can result in significant signaling overhead for a very large number of paths in a large-scale network. Previously proposed virtual network mapping algorithms for multi-network domains can be suitable for mapping service function chain (SFC) requests, but they typically require a centralized orchestrator to maintain a hierarchical topology for all domains in a multi-network domain.

SUMMARY

The present disclosure provides one or more systems, methods, and/or processes of determining service function chains for service function chain requests via network domains, according to one or more embodiments. One or more auxiliary edges that bypass at least one vertex of vertices that represent physical nodes of a first network domain of multiple network domains may be determined. At least one edge, that includes the one or more auxiliary edges and that interconnect the vertices, may be evaluated in order to evaluate a portion of the vertices that excludes the at least one vertex that was bypassed to identify at least one vertex that is associated with at least one service function of a service function chain request that specifies multiple service functions to be performed via at least a portion of physical nodes of the network domains. A first physical node of the physical nodes of the first network domain and associated with the at least one vertex that is associated with the at least one service function may be configured to process data via the at least one service function of the service function chain request. The first physical node may process data via the at least one service function of the service function chain request. Processed data may be provided to at least one of a second physical node of the physical nodes of the first network domain and a second network domain. A third physical node of the physical nodes of the first network domain, associated with the at least one vertex that was bypassed, may transfer at least one of the data and the processed data.

In one or more embodiments, the at least one vertex that is associated with at least one service function of the service function chain request and the at least one vertex that was bypassed may be mapped to a candidate service function chain. It may be determined that all service functions of the service function chain request are mapped, and the candidate service function chain may be provided to a resource orchestrator. In one or more embodiments, multiple service function candidates may be completed. A first candidate service function chain, that includes a first mapping of vertices that include the at least one vertex that is associated with the at least one service function, may be completed. A second candidate service function chain, that includes a second mapping of vertices that include at least one vertex different from the first mapping of vertices, may be completed. A selection from the first candidate service function chain and the second candidate service function chain may be made based on one or more of a service provider policy, a service provider constraint, and a requestor on whose behalf the service function chain request was received, a bandwidth value, a distance value, a number of modes, and delay information, among others.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
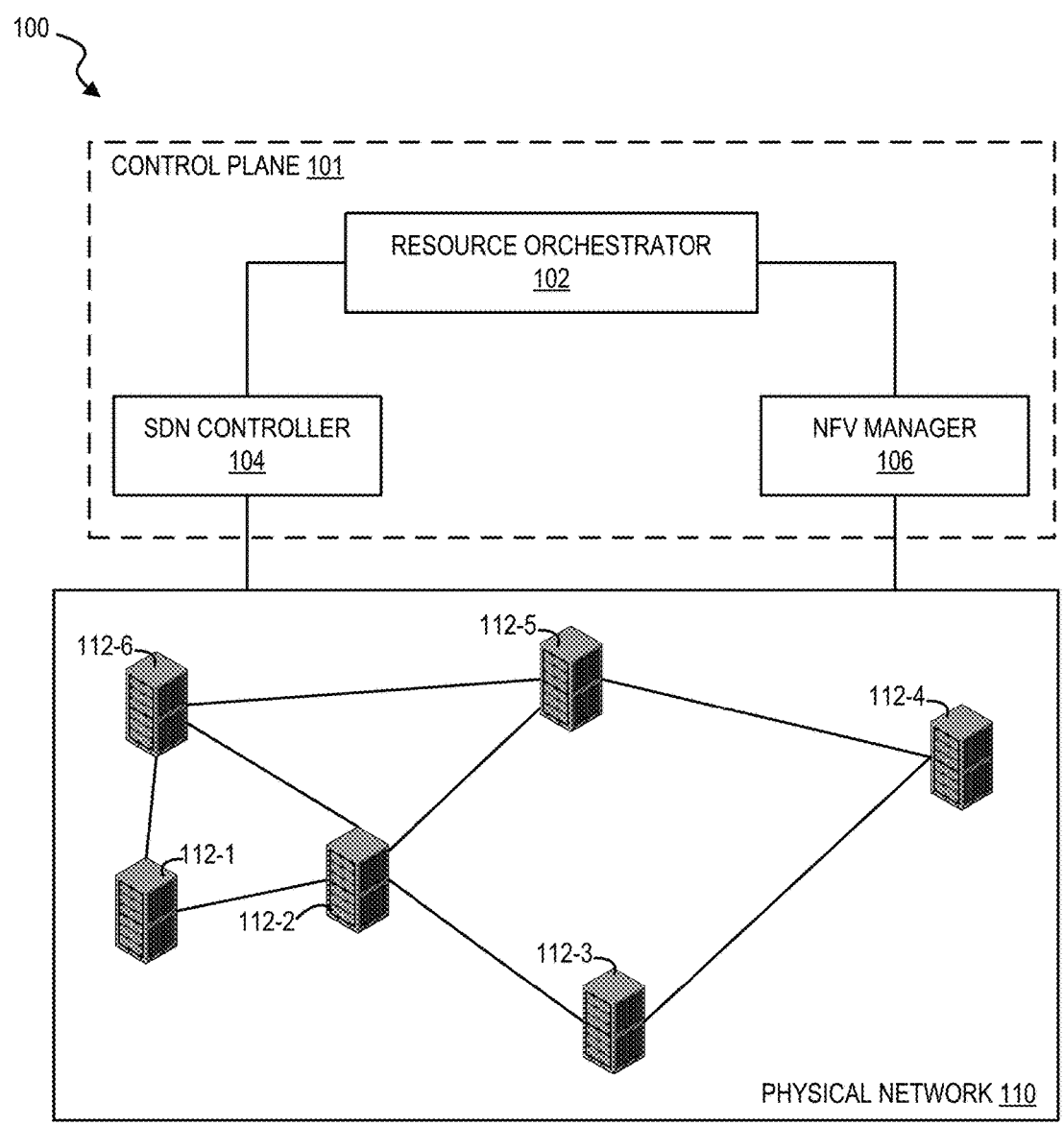
FIG. 1 illustrates exemplary elements of a distributed resource orchestration framework, according to one or more embodiments.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), widget "12-1" refers to an instance of a widget class, which may be referred to collectively as widgets "12" and any one of which may be referred to generically as a widget "12". In the figures and the description, like numerals are intended to represent like elements.

In one or more embodiments, orchestration systems may provide life cycle management of services such as augmented/virtual reality, video distribution, streaming media services, and IoT (Internet of Things), among others. For example, the orchestration systems may provide and/or manage resource allocation and/or deployment of virtual network functions (VNFs) as well as application related service functions (SFs) in software defined infrastructures (SDIs). In one instance, the SFs may include one or more of video codecs, caches, and analytics engines, among others, via network function virtualization (NFV). In another instance, the VNFs may include one or more of firewalls, network address translation (NAT), routing functions, switching functions, and deep packet inspection (DPI), among others. In one or more embodiments, SDIs may include physical network functions (PNFs). For example, the PNFs may include optical transport systems, routers, and/or switches, among others, that may be controlled by a software defined networking (SDN) controller. In one or more embodiments, a high-level management and control architecture for infrastructures that may implement the orchestration systems may include a NFV Management And Orchestration (MANO) that may manage a NFV Infrastructure (NFVI) and lifecycles of VNFs.

In one or more embodiments, orchestration systems may support end-to-end orchestration via resource management and allocation. For example, SDIs may be managed via multiple resource-specific controllers and/or orchestrators that may facilitate individual system deployment and troubleshooting. For instance, a datacenter may be managed by a cloud resource orchestrator (e.g., OpenStack, etc.), and the cloud resource orchestrator may provide VMs to SFs and/or VNFs. In one or more embodiments, intra-datacenter networks connecting various VMs may be managed by one or more SDN controllers, and wide area networks (WANs) for inter-datacenter connections may be managed by a different set of one or more SDN controllers. For example, the one or more SDN controllers that manage the intra-datacenter networks connecting various VMs may utilize ONOS (e.g., a network operating system), and the one or more SDN controllers that manage the WANs for inter-datacenter connections may utilize OpenDaylight (e.g., a framework that supports software defined networking and network function virtualization).

In one or more embodiments, partitioning of resource management may create an evolutionary SDI with nodes (e.g., network and/or computing elements) having heterogeneous functions spanning across multiple network domains. In one example, some nodes may host service functions (e.g., SFs, VNFs, etc.). In a second example, some nodes may provide switch functions (e.g., routers, switches, etc.). For instance, the nodes that may provide switch functions may couple and/or "chain" multiple nodes that may host service functions. In another example, some nodes may host both service and switch resources (e.g., "whitebox" switches with embedded servers supporting VNFs). For instance, the nodes that may host both service and switch resources may provide resource-efficient chaining.

In one or more embodiments, orchestrators may interact with users via an intent-based declarative interface to accommodate user requests. For example, an orchestrator may divide a user request into one or more SFs and/or VNFs and may provide a forwarding graph utilizable in delivering a service associated with the user request. In one or more embodiments, orchestrators may provide sizing and placement of VNFs/SFs as well as network connectivity based on the available resources in a SDI. For example, in a case of a video streaming service, orchestrators may instantiate a codec SF via an appropriate node and route the stream to the codec by provisioning associated network connectivity. As such, orchestrators may perform resource allocation that jointly considers VNFs, SFs, and physical network devices for end-to-end service deployment to enable end-to-end service automation and/or to improve resource utilization, according to one or more embodiments.

As will be described herein, a distributed resource orchestration framework is disclosed that provides a scalable vertex-centric distributed approach for identifying qualified service function chain (SFC) solutions in a multi-network domain. In one or more embodiments, the distributed resource orchestration framework disclosed herein may apply vertex-centric distributed processing approach that enables different vertices to exchange information about possible SFC solutions iteratively using messages until one or more possible solutions (e.g., candidate solutions) have been identified. For example, the distributed resource orchestration framework may map SFC requests in a multiple domain SDI with heterogeneous node functions (e.g., switch functions, service functions, etc.). In one or more embodiments, one or more distributed vertex-centric systems, methods, and/or processes may not need and/or may not utilize a global view and/or database in determining one or more possible solutions for one or more end-to-end service requests.

Turning now to the drawings, FIG. 1 illustrates exemplary elements of an exemplary distributed resource orchestration framework, according to one or more embodiments. As shown, a network domain 100 may be based on nodes that are network elements (NEs). As illustrated, network domain 100 may include a domain-specific resource orchestrator 102 and a physical network 110. In one or more embodiments, physical network 110 may include an underlying optical network, such as an optical transport network (OTN) and/or a flexible optical data plane (e.g., flexible transceivers) configured to adjust the bandwidth of connections.

In one or more embodiments, resource orchestrator 102 may manage and/or coordinate utilization of resources of network domain 100. For example, resource orchestrator 102 may manage and/or coordinate utilization of one or more of NEs 112. For instance, NEs 112 may include one or more types of network functionality, such as switches, routers, etc., and may include hardware that communicatively couples one or more types of physical interfaces.

As shown, network domain 100 may include NEs 112-1 through 112-6, along with communicative couplings among NEs 112-1 through 112-6 that may include various distances. In one or more embodiments, network domain 100 may include a network topology for a single network domain, where resource orchestrator 102 may manage and/or coordinate utilization of resources.

In one or more embodiments, one or more network management functions of network domain 100, other than those provided by resource orchestrator 102, may be provided by a SDN controller 104. For example, in utilization of multiple network domains, each network domain may be managed by a respective SDN controller. For instance, one or more of resource orchestrator 102 and SDN controller 104 may keep track of (e.g., store) one or more network configurations and/or one or more network topologies of network 110.

In one or more embodiments, network domain 100 may be included in a multi-network domain that utilizes distributed processing approach, where messages are exchanged between or among resource orchestrators and/or network controllers, such as resource orchestrator 102 and/or a SDN controller 104, each of which is associated with a respective network of the multi-network domain, such as physical network 110. In one or more embodiments, resource orchestrators may work collaboratively to execute a SFC in a multi-network domain, which may include identifying one or more possible SFC solutions, selecting one or more of the one or more possible SFC solutions for execution (e.g., dependent on preferences and/or various policies, etc.), and configuring physical resources of various network nodes to implement the one or more selected solutions.

As illustrated, network domain 100 may include a NFV manager 106. In one or more embodiments, NFV manager 106 may be utilized in virtualizing network functions and/or migrating network functions from devices that are configured for a single, specific purpose to multi-purpose virtual machines on commercial off-the-shelf servers, which may reduce service deployment costs and/or improve service flexibility. In one example, NFV manager 106 may manage instantiation and/or life cycle of one or more virtual network functions (VNFs). For instance, a VNF may be implemented by and/or executed via a virtual machine (VM). In a second example, NFV manager 106 may store information associated with one or more NEs. For instance, NFV manager 106 may store one or more of a number of virtual machines (VMs), an amount of storage space is available, and an amount of storage space is utilized, among others, associated with a NE. In another example, NFV manager 106 may provide information associated with one or more NEs to resource orchestrator 102.

In one or more embodiments, resource orchestrator 102, SDN controller 104, and NFV manager 106 may form a control plane 101 or at least may form a portion of control plane 101. As described, one or more elements of control plane 101 may configure and/or control network elements of physical network 110, for example.

In a system that utilizes a NFV manager, VNFs may be invoked in an order, referred to as a SFC to provide an end-to-end network service, according to one or more embodiments. In one example, service function chaining may include configuring and/or allocating various VMs to implement and/or execute the virtualized network functions. In another example, service function chaining may include steering, routing, and/or shaping traffic across one or more networks and/or one or more network domains. For instance, a traffic flow may be steered, routed, and/or shaped via a number of VNFs and/or SFs in an order based on one or more preferences and/or policies.

In one or more embodiments, service function chaining may be supported by the application of resource orchestration. For example, resource orchestration elements, referred to herein as resource orchestrators, may collectively and/or individually manage and/or coordinate utilization of one or more resources (including one or more service functions, one or more virtual machines, and/or one or more networks) at each data center, as well as the associated network resources to interconnect the VNFs. With the migration of VNFs to VMs in geographically distributed datacenters and the rollout of SDN controlled on-demand connectivity in IP/OTN networks, distributed resource orchestration across multi-network domains, as described herein, may be highly beneficial for providing end-to-end network services, according to one or more embodiments. For example, a network service may span across multiple networks such as consumer broadband, mobile backhaul, mobile packet core, and/or virtual private networks (including, e.g., networks implemented on the 1Finity™ platform from Fujitsu Network Communications Inc.), among others.

In one or more embodiments, a large-scale multi-network domain may include multiple different domains, and these domains may have various network technologies, various vendors, various administrations, various types of resources, and/or various virtualized networks. For example, these domains may include domains in that reside IoT devices, computing resources, storage resources, and/or different types of service functions (including access service functions, metro service functions, and/or core service functions). In one or more embodiments, these multi-network domains may preserve confidentiality among domains and may improve scalability for service providers. In one or more embodiments, each network domain may be controlled by a local orchestrator, and vertex-centric distributed computing among the orchestrators may be utilized for end-to-end resource allocation.

Figure 2:
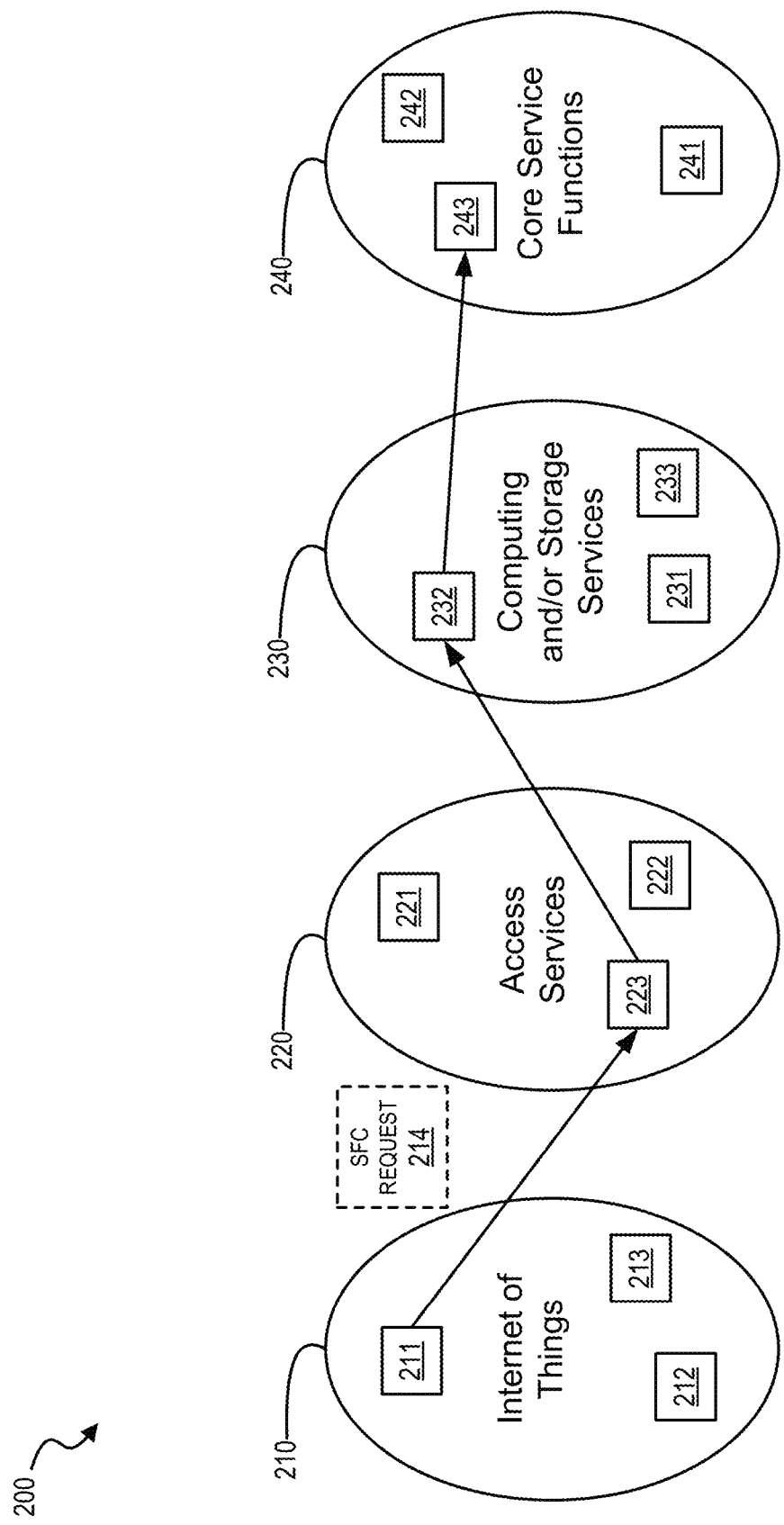
FIG. 2 provides a block diagram of selected elements of a multi-network domain for providing end-to-end services, according to one or more embodiments.

Turning now to FIG. 2, a block diagram of selected elements of a multi-network domain for providing end-to-end services is illustrated, according to one or more embodiments. As shown, a multi-network domain 200 may include four network domains 210, 220, 230, and 240, and each of domains 210, 220, 230, and 240 may include one or more nodes that may be represented via vertices in determining one or more possible SFC solutions. In one or more embodiments, one or more nodes may implement one or more service functions utilizing resources within a respective domain.

As illustrated, domain 210 may represent an Internet of Things. For example, one or more of devices 211 through 213 of domain 210 may issue one or more service function chain requests. As shown, domain 220 may represent one or more data centers and/or other entities that may provide access services that may be included in a SFC. For example, domain 220 may include services 221 through 223, among others. As illustrated, domain 230 may represent one or more data centers and/or other entities that may provide computing and/or storage services that may be included in a SFC. For example, domain 230 may include services 231 through 233, among others. As shown, domain 240 may represent one or more data centers and/or other entities that may provide core service functions that may be included in a SFC. For example, domain 240 may include services 241 through 243, among others.

In an illustrated example, device 211 of domain 210 may issue a SFC request 214, which may include at least one access service, one computing or storage service, and one core service function. More specifically, SFC request 214 may specify a SFC that includes an access service function 223 (which is available on one of the nodes within domain 220), a computing or storage service function 232 (which is available on one of the nodes within domain 230), and a core service function 243 (which is available on one of the nodes within domain 240).

In one or more embodiments, one or more systems, processes, and/or methods described herein for performing vertex-centric distributed computing to identify qualified SFC solutions for a SFC request may be applied and/or implemented via systems that include network function virtualization, mobile edge computing, and/or IoTs with data analytics, and in which traffic (e.g., data) traverses a sequence of service function instances across multiple domains.

In one or more embodiments, each domain in a multi-network domain may include physical nodes and/or Internet protocol/optical transport network links. In one or more embodiments, a respective resource orchestrator may be associated with each network domain to manage physical nodes and links within the domain. In one or more embodiments, each physical node may include one or more NEs (e.g., one or more network switches, network routers, etc.) and/or one or more compute servers and/or storage elements (e.g., datacenters) capable of invoking a subset of service functions selected from a catalog of service functions.

Some examples of the service functions provided in these multi-network domains include firewalls, deep packet inspection (DPI), network address translation (NAT), load balancers, and parental control functions. In one example, a SFC may include a firewall service function, a DPI service function, a parental control service function, and an anti-virus service function, each of which may be provided by one or more nodes in a different network domain. In another example, a SFC may include a NAT service function between two other types of service functions and/or between other service functions and an Internet access service function, each of which may be provided by one or more nodes in a different network domain.

Figure 3A:
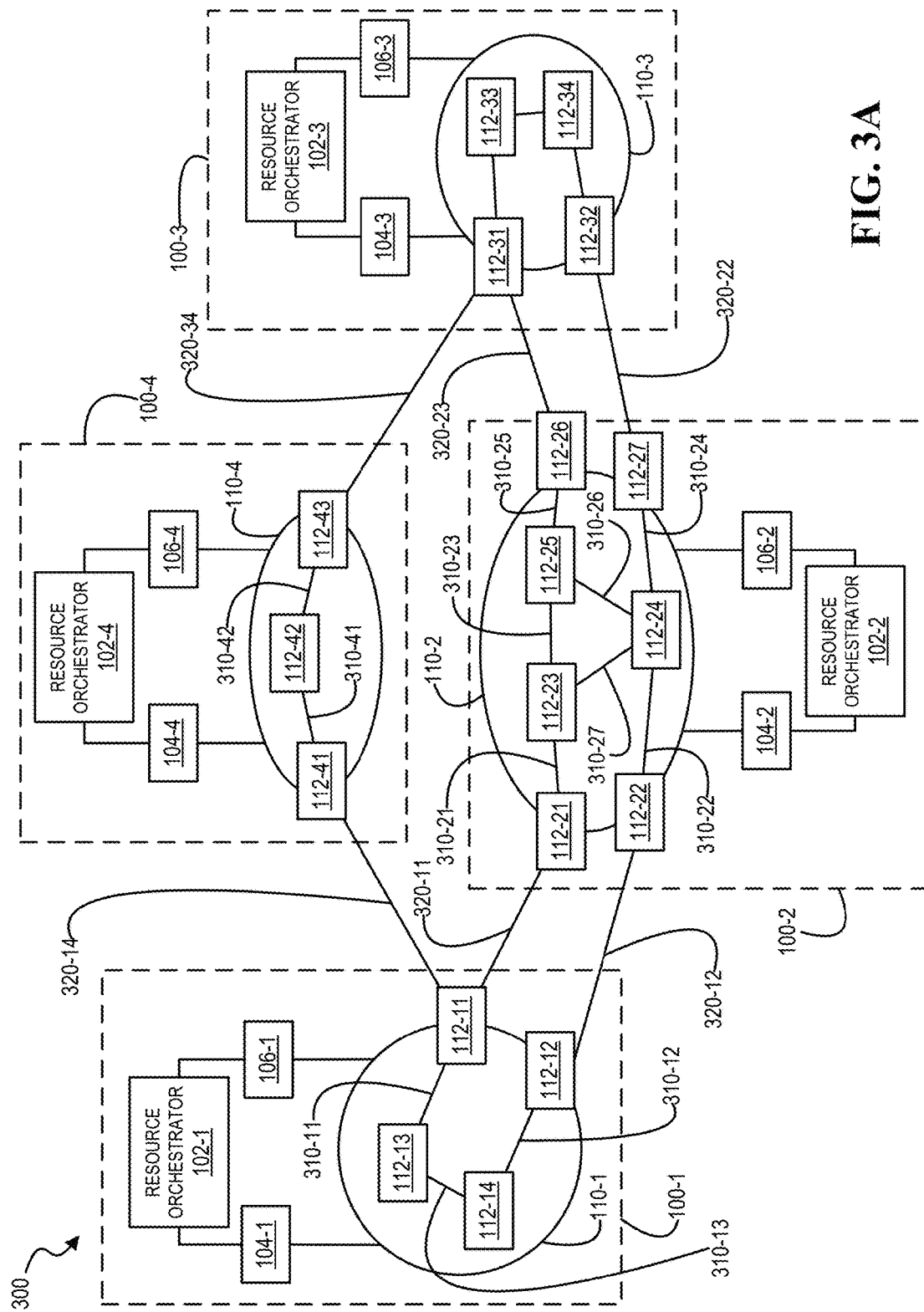
FIG. 3A illustrates an exemplary multi-network domain of network domains, according to one or more embodiments.

Turning now to FIG. 3A, an exemplary multi-network domain 300 of network domains is illustrate, according to one or more embodiments. Although distributed network domains 100 of multi-network domain 300 are shown as a specific network topology, it will be understood that various different types and sizes of networks and different numbers of network domains may be utilized with a network service computation system described herein. Note that the distributed network domains 100 of multi-network domain 300 are shown as a schematic illustration and are not drawn to scale.

As illustrated, multi-network domain 300 may include networks 110, and each network 110 may include respective one or more NEs 112. In one or more embodiments, a network element (NE) may be or include a switch, a router, a network element, a computer system, a data center, a sub-network, and a sub-domain, among others. In one example, a NE may be operable to provide network connectivity to one or more other NEs. For instance, the NE may provide one or more network services. In another example, a NE may be operable to provide one or more computational resources. For instance, the one or more computational resources may provide service functions.

As shown, NEs may be communicatively coupled via intra-network domain communicative couplings 310 and/or may be coupled via inter-network domain communicative couplings 320. In one or more embodiments, a value may be associated with one or more communicative couplings 310 and/or one or more communicative couplings 320. For example, a value (e.g., a transit value) associated with a communicative coupling may be based on one or more of a distance of the communicative coupling, a bandwidth of the communicative coupling, and a number of communication channels of the communicative coupling, among others. For instance, a value associated with a communicative coupling may be associated with a delay value for utilizing the communicative coupling to communicate information via the communicative coupling.

Figure 3B:
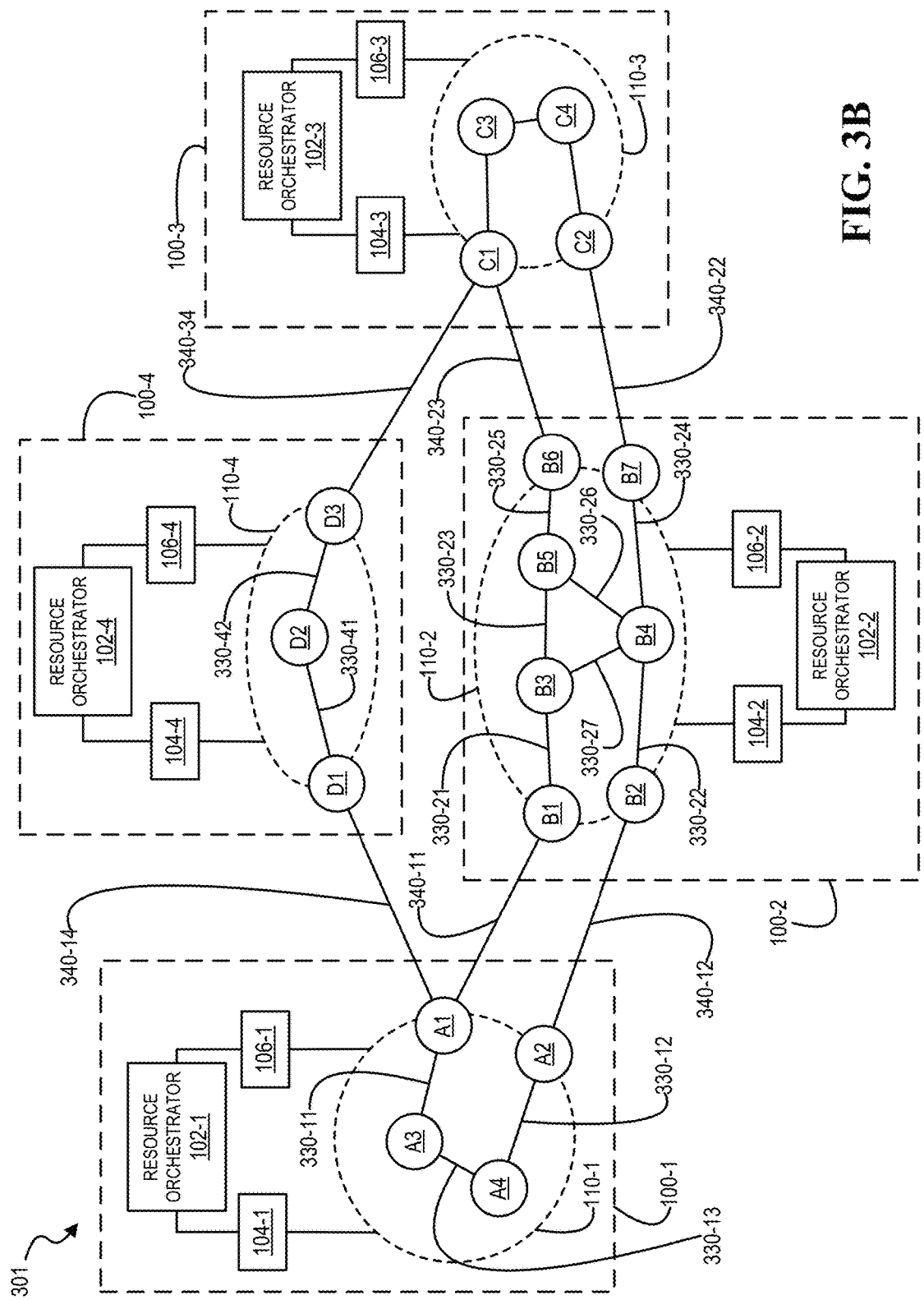
FIG. 3B illustrates a graph-based representation of a multi-network domain, according to one or more embodiments.

Turning now to FIG. 3B, a graph-based representation 301 of multi-network domain 300 is illustrated, according to one or more embodiments. As shown, graph-based representation 301 may include vertices A1 through A4, B1 through B7, C1 through C4, and D1 through D3; edges 330; and edges 340.

In one or more embodiments, a vertex may be a logical representation of a network element (e.g., a node). For example, the network element may be or include an individual computing unit. In one instance, the network element may be or include a server. In a second instance, the network element may be or include one or more switching elements. In a third instance, the network element may be or include one or more routing elements. In another instance, the network element may be or include a data center.

In one or more embodiments, resource orchestrator 102 may store one or more vertices in memory. For example, vertices A1 through A4 may represent NEs 112-11 through 112-14, respectively; vertices B1 through B7 may represent NEs 112-21 through 112-27, respectively; vertices C1 through C4 may represent NEs 112-31 through 112-34, respectively; vertices D1 through D3 may represent NEs 112-41 through 112-43, respectively; edges 330-11 through 330-42 may represent communicative couplings 310-11 through 310-42, respectively; and edges 340-11 through 340-24 may represent communicative couplings 320-11 through 320-24, respectively. For instance, resource orchestrator 102-1 may store vertices A1 through A4, among others; resource orchestrator 102-2 may store vertices B1 through B7, among others; resource orchestrator 102-3 may store vertices C1 through C4, among others; and resource orchestrator 102-4 may store vertices D1 through D3, among others.

In one or more embodiments, a vertex may be associated with a data structure stored via a resource orchestrator. For example, the data structure associated with the vertex may include and/or store one or more of a value (e.g., based on one or more of a number of incoming edges and a number of outgoing edges), information indicating a number of compute resources available in a corresponding NE (e.g., physical node), a number of storage resources available on the corresponding NE, a vertex identification (ID) for the corresponding NE, a compute method, and one or more service functions that are implemented and/or available on the corresponding NE, among others.

In one or more embodiments, a compute method of a vertex may exchange messages with other one or more other vertices. In one example, a compute method of A1 may exchange one or more messages with A3 via memory of resource orchestrator 102-1. In a second example, a compute method of A1 may exchange one or more messages with one or more of B1 and D1 via a communication control channel that communicatively coupled two or more resource orchestrators 102. In another example, a compute method may be or include a user-defined method. In one or more embodiments, an edge may be associated with a data structure stored via a resource orchestrator. For example, the data structure associated with the edge may include and/or store one or more of a bandwidth value, a distance value, a number of channels (e.g., fiber optic wavelengths), delay information, and a cost associated with utilization of the associated link, among others.

In one or more embodiments, resource orchestrators associated with different network domains may be interconnected via control channels for communication to compute requests (e.g., service function chaining requests), based on a vertex-centric distributed processing described herein. For example, the resource orchestrators (such as various ones of resource orchestrators 102) may communicate with each other and may be networked together using any topology, such as a mesh, a ring, a star, or a bus, among others. Similarly, SDN controllers for the network domains may communicate with each other and may be networked together using any topology, such as a mesh, a ring, a star, or a bus, among others. In one or more embodiments, the communication among resource orchestrators 102 and/or among SDN controllers 104 may employ a sideband network channel, or other network connection for management purposes, that may not otherwise interfere with network connections between nodes, which may represent a payload network offered as a commercial service to customers by a service provider.

In one or more embodiments, a resource orchestrator may store information associated with one or more associated physical nodes as one or more vertex data structures and/or may store information associated with one or more overlay OTN links as one or more edge data structures. In one or more embodiments, resource orchestrators (such as various ones of the resource orchestrators 102) may send messages to each other to compute a final result for a distributed computation to solve a service function chain request. For example, each resource orchestrator may maintain a logical representation of the physical infrastructure of its network domain, where the vertices in the resource orchestration architecture represent the physical NEs in that network domain. In one or more embodiments, a vertex may maintain information about its incoming and outgoing edges, and a compute method, which may be or include a user-defined function. In one or more embodiments, a computation may be broken down into iterations, referred to as "supersteps". For example, a resource orchestrator may coordinate execution of compute methods of one or more vertices of its network domain.

Figure 4:
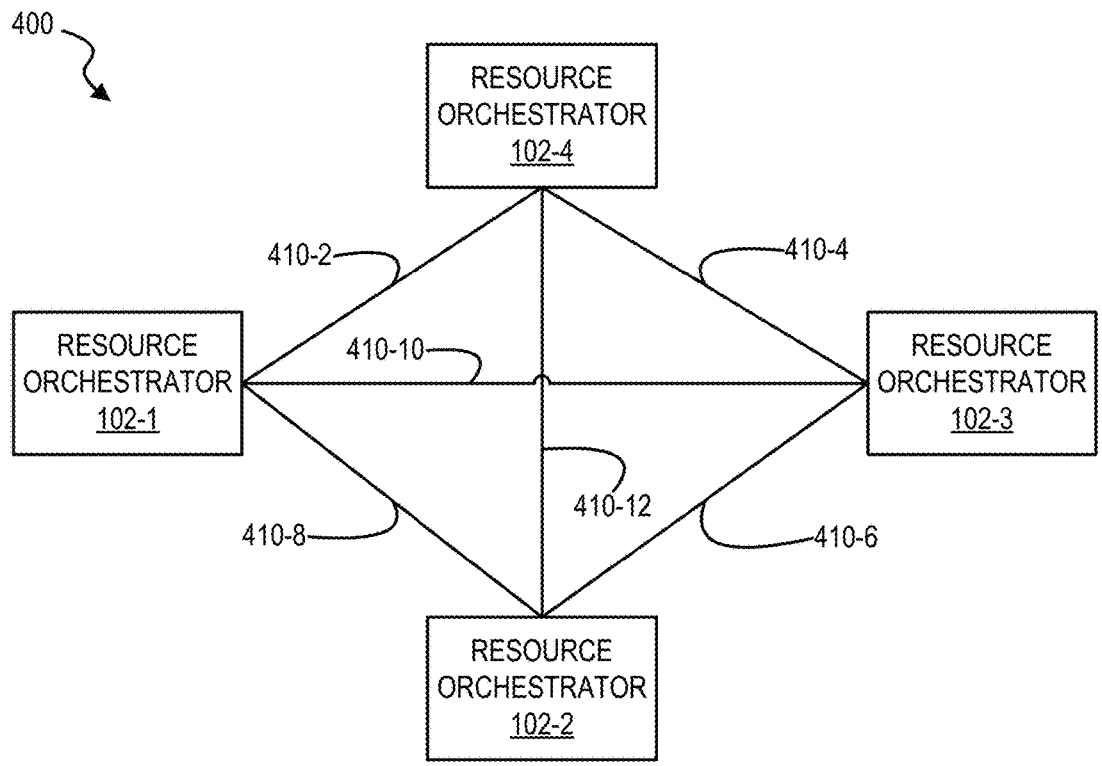
FIG. 4 illustrates a distributed resource orchestration architecture that includes communication channels of resource orchestrators of different network domains, according to one or more embodiments.

Turning now to FIG. 4, a distributed resource orchestration architecture 400 that includes communication channels of resource orchestrators of different network domains is illustrated, according to one or more embodiments. As shown, distributed resource orchestration architecture 400 may include communicative couplings 410-2 through 410-12. In one or more embodiments, a communicative coupling 410 may convey control information between two resource orchestrators 102. For example, a communicative coupling 410 may convey messages between two vertices of respective different resource orchestrators. For instance, one or more messages between two vertices may include a SFC request, a SFC chain, and/or a partial SFC chain, among others.

In one or more embodiments, one or more communicative couplings 410 may be implemented via one or more communicative couplings 310 and/or one or more communicative couplings 320. In one example, one or more communicative couplings 410 may include one or more in-band communications via one or more of communicative couplings 310 and/or one or more communicative couplings 320. In another example, one or more communicative couplings 410 may include one or more out-of-band communications via one or more communicative couplings 310 and/or one or more communicative couplings 320.

Figure 5:
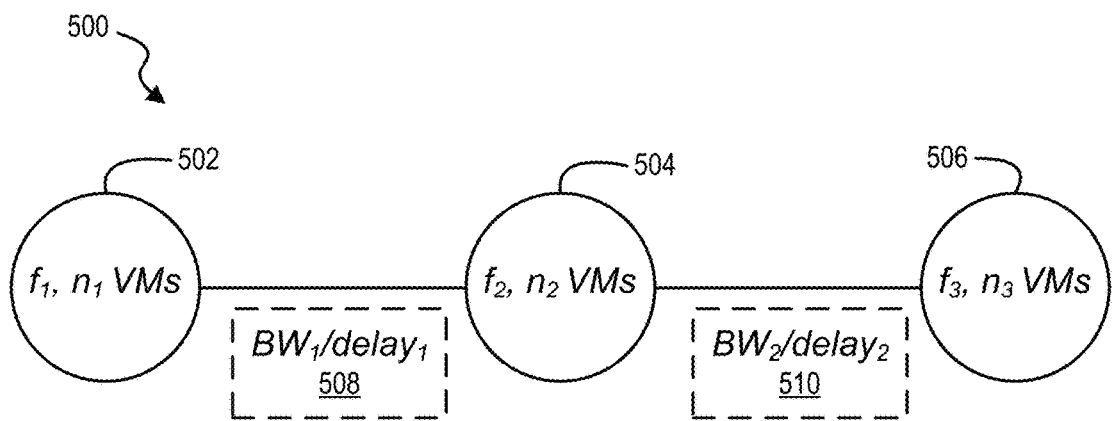
FIG. 5 provides an abstraction of an exemplary service function request, according to one or more embodiments.

Turning now to FIG. 5, an abstraction of an exemplary SFC request 500 is illustrated, according to one or more embodiments. In one or more embodiments, a distributed resource orchestration system may identify one or more nodes, each including a number of VMs that may perform respective service functions. For example, as illustrated, to fulfill SFC request 500, the distributed resource orchestration system may need to identify a first node 502 that includes $n_1$ VMs and can perform a first service function $f_1$; a second node 504 that includes $n_2$ VMs and can perform a second service function $f_2$; and a third node 506 that includes $n_3$ VMs and can perform a third service function $f_3$.

In one or more embodiments, a distributed resource orchestration system may verify that communication links between the identified one or more nodes (e.g., network elements) meets one or more bandwidth and/or delay specifications. In one example, the distributed resource orchestration system may verify that a communication link between node 502 and node 504 meets or exceeds a first bandwidth and/or delay specification 508 (e.g., $BW_1$ and/or $delay_1$). In another example, the distributed resource orchestration system may verify that a communication link between node 504 and node 506 meets or exceeds a second bandwidth and/or delay specification 510 (e.g., $BW_1$ and/or $delay_1$).

In one or more embodiments, one or more SFC requests may include two characteristics that may contrast with other types of virtual network requests. In one example, a SFC request may be linear in topology. In another example, a SFC request may be flexible with respect to an order in which service functions are executed. In one or more embodiments, a vertex-centric distributed computing approach to solve service function chaining in multi-network domains may be based on characteristics of SFC requests.

Figure 6:
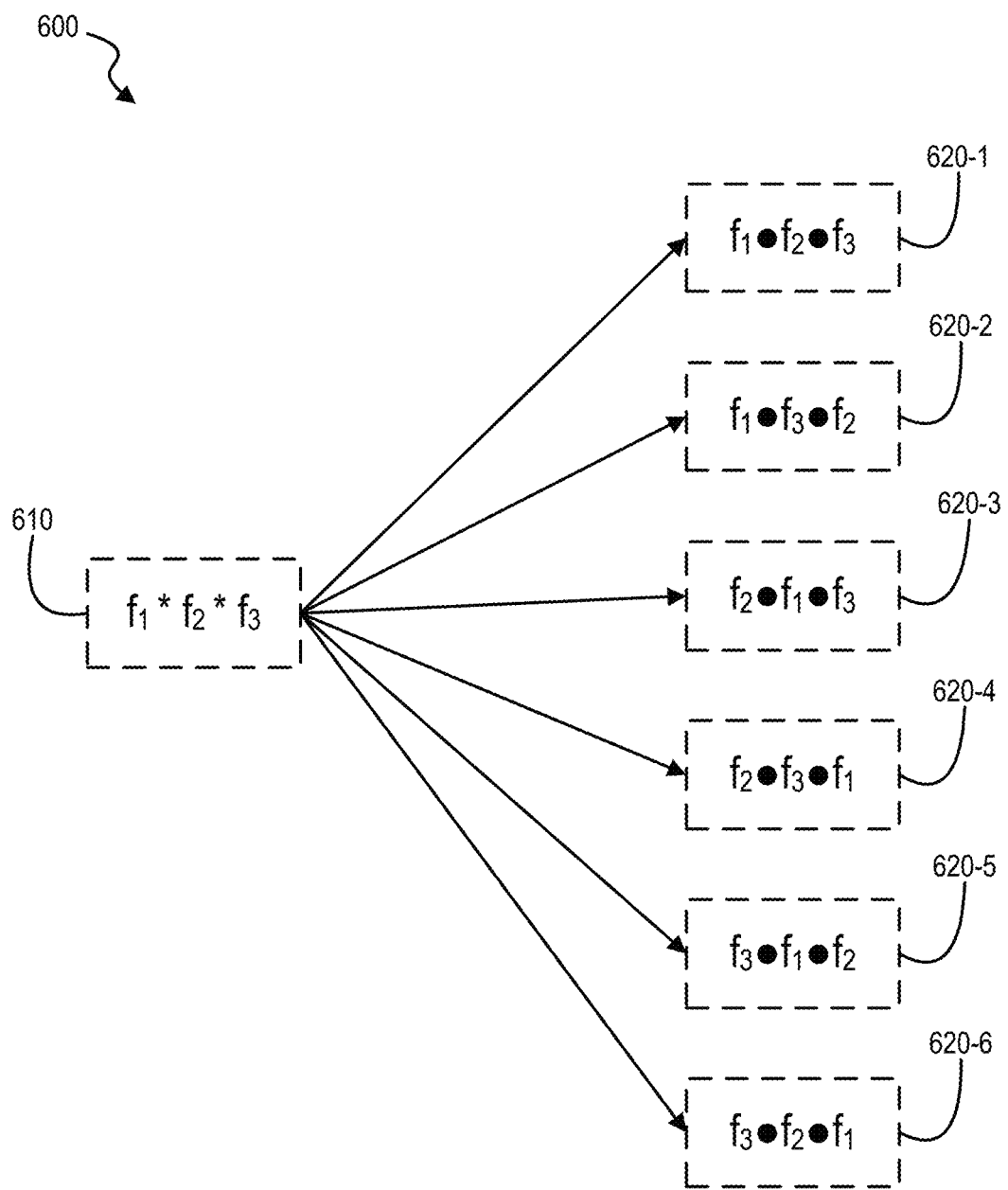
FIG. 6 illustrates a service chain function request associated with a flexible order service chain function and fixed order service chain function possibility mapping, according to one or more embodiments.

Turning now to FIG. 6, a SFC request associated with a flexible order SFC and fixed order SFC possibility mapping 600 is illustrated, according to one or more embodiments. A symbol "*" may represent a flexible ordering, and a symbol "·" may represent a fixed ordering, according to one or more embodiments. As shown, a flexible order SFC 610 may be mapped to a fixed order SFC of possible fixed order service function chains (SFCs) 620. In one or more embodiments, a vertex-centric distributed processing approach may include performing iterations of supersteps that are sequentially executed. For example, one or more supersteps may involve receiving messages and/or information at one or more resource orchestrators 102 and/or at one or more SDN controllers 104, performing local actions (such as executing a common compute method) with respective network domains 100, and sending out messages to other one or more resource orchestrators 102 and/or to other one or more SDN controllers 104. In one or more embodiments, a vertex-centric distributed processing approach may be employed with a network operating system using distributed network domains such as those described herein.

Figure 7:
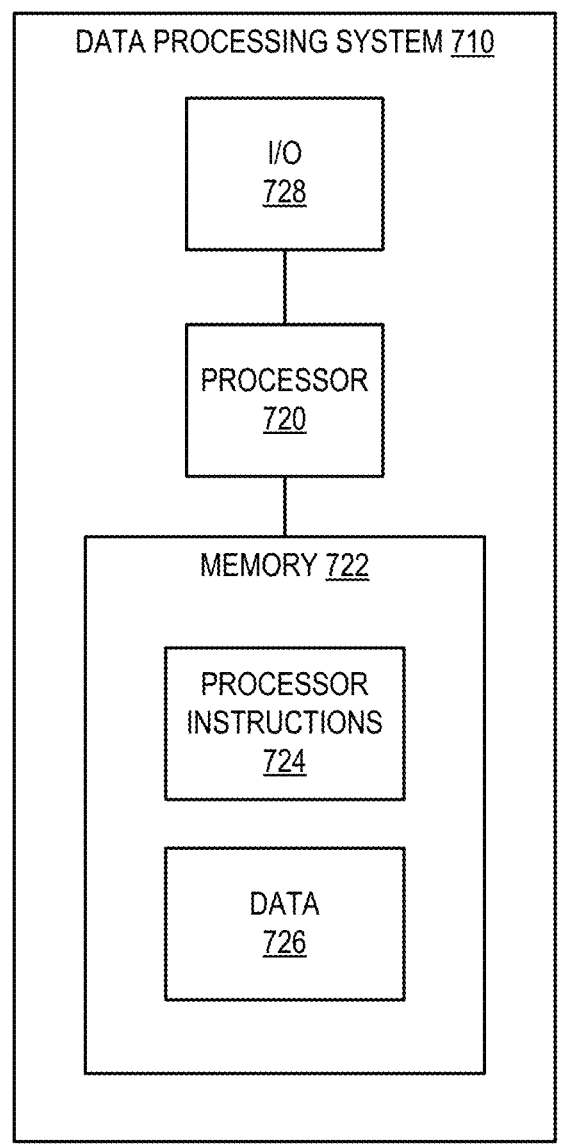
FIG. 7 provides a block diagram of an exemplary data processing system, according to one or more embodiments.

Turning now to FIG. 7, a block diagram of an exemplary data processing system is illustrated, according to one or more embodiments. As shown, a data processing system 710 may include a processor 720, a memory 722 communicatively coupled to processor 720, and an input/output (I/O) subsystem 728 communicatively coupled to processor 720. In one or more embodiments, one or more of resource orchestrators 102, one or more of SDN controllers 104, one or more of NFV managers 106, and/or one or more of NEs 112 may include one or more structures and/or one or more functionalities of those described with reference to data processing system 710.

In one or more embodiments, memory 722 may include a system, device, and/or apparatus to store processor instructions 724 and data 726 for a period of time. For example, memory 722 may include different numbers of physical storage devices. For instance, memory 722 may include various types components and devices, such as random access memory (RAM), electrically erasable programmable read-only memory (EEPROM), a PCMCIA (personal computer memory card international association) card, ferroelectric RAM (FRAM), flash memory, one or more solid state disks, one or more hard disk drives, one or more magnetic tape libraries, one or more optical disk drives, one or more magneto-optical disk drives, one or more compact disk drives, one or more compact disk arrays, one or more disk array controllers, and/or any suitable selection or array of volatile and/or non-volatile memory. In one or more embodiments, memory 722 may store information (e.g., processor instructions 724, data 726, etc.) for a period of time sufficient to be or include non-transitory computer-readable media. In one or more embodiments, memory 722 may include non-volatile memory. For example, non-volatile memory may refer to memory that retains data after power is turned off.

In one or more embodiments, processor instructions 724 may be executable by processor 720 to implement one or more methods, one or more processes, and/or one or more systems described herein. For example, processor instructions 724 may be configured, coded, and/or encoded with instructions in accordance with one or more of flowcharts, methods, and/or processes described herein. For instance, processor instructions 724 may be executable by processor 720 in implementing a vertex-centric distributed method that identifies qualified solutions of a SFC request in a multi-network domain.

In one or more embodiments, data 726 may store information usable by processor 720 and/or processor instructions 724. In one example, data 726 may store information representing a SFC request, node information (including information indicating the available compute and/storage resources and/or service functions), edge information (e.g., via one or more edge data structures), vertex information (e.g., via one or more vertex data structures). In one instance, data 726 may store one or more of vertices (e.g., one or more of vertices A1 through A4, B1 through B7, C1 through C4, and D1 through D3, among others). In another instance, data 726 may store one or more of edges 330 and/or one or more of edges 340.

In a second example, data 726 may store information representing one or more partially mapped service function chains. In a third example, data 726 may store information representing one or more candidate solutions for a SFC request. In a fourth example, data 726 may store information representing one or more user resource usage preferences and/or one or more policies. In a fifth example, data 726 may store information representing one or more inputs and/or one or more outputs of a SF. In another example, data 726 may store information representing one or more values of any default and/or one or more configurable parameters utilizable to implement functionality described herein.

In one or more embodiments, I/O subsystem 728 may permit and/or provide interaction with data processing system 710 and/or associated components of data processing system 710. For example, I/O subsystem 728 may include one or more busses, one or more serial devices, and/or one or more network interfaces, among others, that may enable data processing system 710 and/or processor 720 to implement one or more systems, processes, and/or methods described herein.

Figure 8:
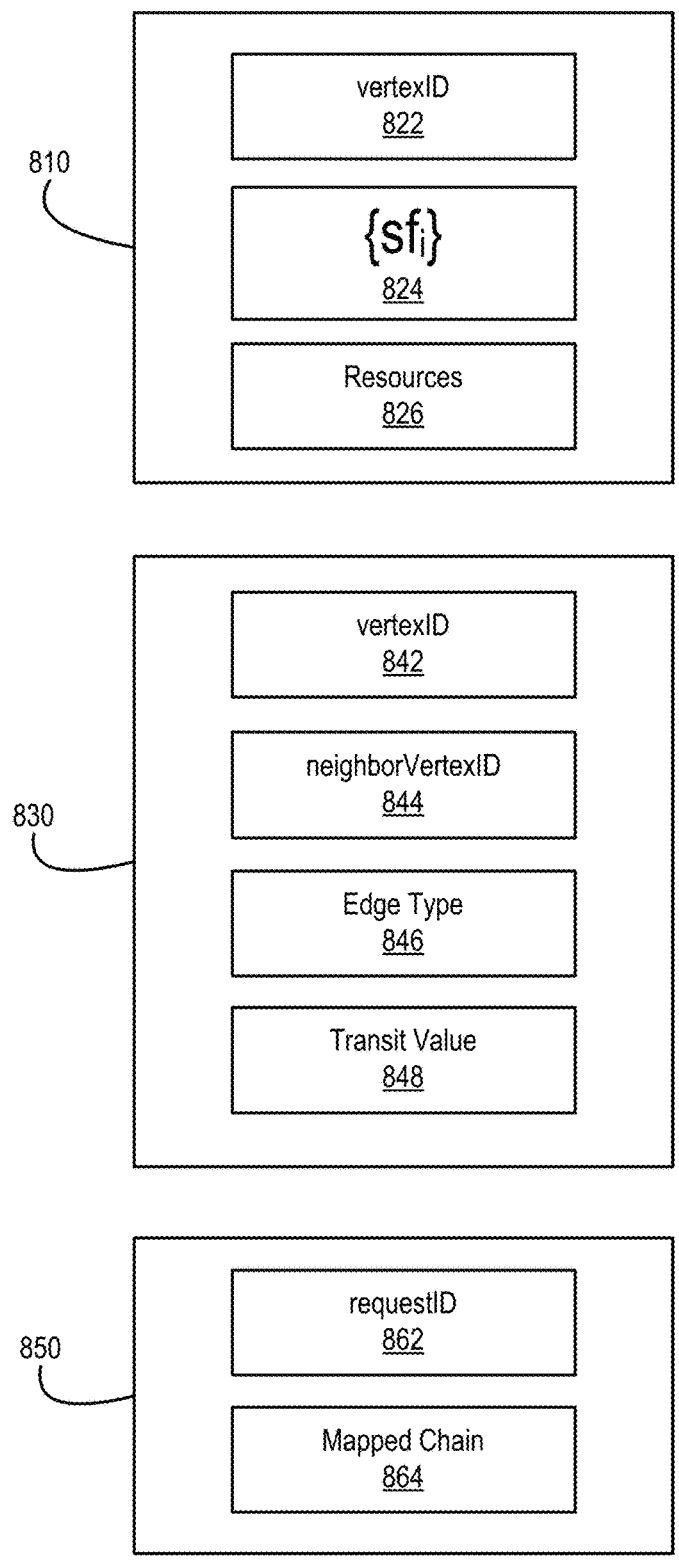
FIG. 8 provides block diagrams of exemplary data structures, according to one or more embodiments.

Turning now to FIG. 8, exemplary block diagrams of data structures are illustrated, according to one or more embodiments. As shown, a data structure 810 may include a vertexID 822, a SF set 824, and resources 826. In one example, vertexID 822 may store an identification of a vertex. In a second example, SF set 824 may store a subset of SFs of a SFC request. In another example, resources 826 may store resource information associated with a vertex. In one instance, the resource information associated with the vertex may include a number of VMs (e.g., utilized VMs, available VMs, etc.). In another instance, the resource information associated with the vertex may include information associated with storage (e.g., utilized storage, available storage, etc.) associate with the vertex. In one or more embodiments, an instance of data structure 810 may be referred to as a "vertex value". For example, data 726 may store one or more vertex values via one or more instances of data structure 810. For instance, data 726 may store one or more of vertices (e.g., one or more of vertices A1 through A4, B1 through B7, C1 through C4, and D1 through D3, among others) via one or more data structures 810.

As illustrated, a data structure 830 may include a vertexID 842, a neighborVertexID 844, an edge type 846, and a transit value 848. In one example, vertexID 842 may store an identification of a vertex. In a second example, neighborVertexID 844 may store an identification of a neighboring vertex of the vertex identified via vertexID 824. In a third example, edge type 846 may store information indicating that a type of edge is inter-domain, intra-domain, or auxiliary, among others. In another example, transit value 848 may store information associated with information transiting a communicative coupling (e.g., a communications link) associated with an edge between vertices identified via vertexID 842 and neighborVertexID 844. For instance, transit value 848 may include multiple dimensions and/or may be based on and/or associated with one or more of a distance of the communicative coupling, a bandwidth of the communicative coupling, a delay of the communicative coupling, and a number of communication channels of the communicative coupling, among others.

In one or more embodiments, transit value 848 may be utilized in determining if a communicative coupling, associated with an edge, is within a communication budget of a SFC request. In one example, transit value 848 may be utilized in determining if a bandwidth of a communicative coupling, associated with an edge, is within a communication budget of a SFC request. In another example, transit value 848 may be utilized in determining if a delay of a communicative coupling, associated with an edge, is within a communication budget of a SFC request. In one or more embodiments, an instance of data structure 830 may be referred to as an "edge value". For example, data 726 may store one or more edge values. For instance, data 726 may store one or more of edges 330 and/or one or more of edges 340 via one or more data structures 830.

As shown, a data structure 850 may include a requestID 862 and a mapped chain 864. In one example, requestID 862 may store an identification of a SFC request. In another example, mapped chain 864 may store information associated with a SFC. In one instance, mapped chain 864 may store information associated with an entire SFC. In second instance, mapped chain 864 may store information associated with a partially mapped SFC. In another instance, mapped chain 864 may store information associated with a candidate SFC that is a partially mapped SFC or an entire SFC. In one or more embodiments, mapped chain 864 may store a sequence of path segments. For example, the sequence of path segments may include a sequence of path segments of a SFC request.

In one or more embodiments, an instance of data structure 850 may be referred to as a "message format". In one example, data structure 850 may be utilized to provide a message from a first vertex to a second vertex, different from the first vertex, via memory 722. In another example, data structure 850 may be utilized to provide a message from a first vertex to a second vertex, different from the first vertex, via one of communicative couplings 410 (illustrated in FIG. 4) if the first vertex and the second vertex are of two different respective resource orchestrators.

Figure 9:
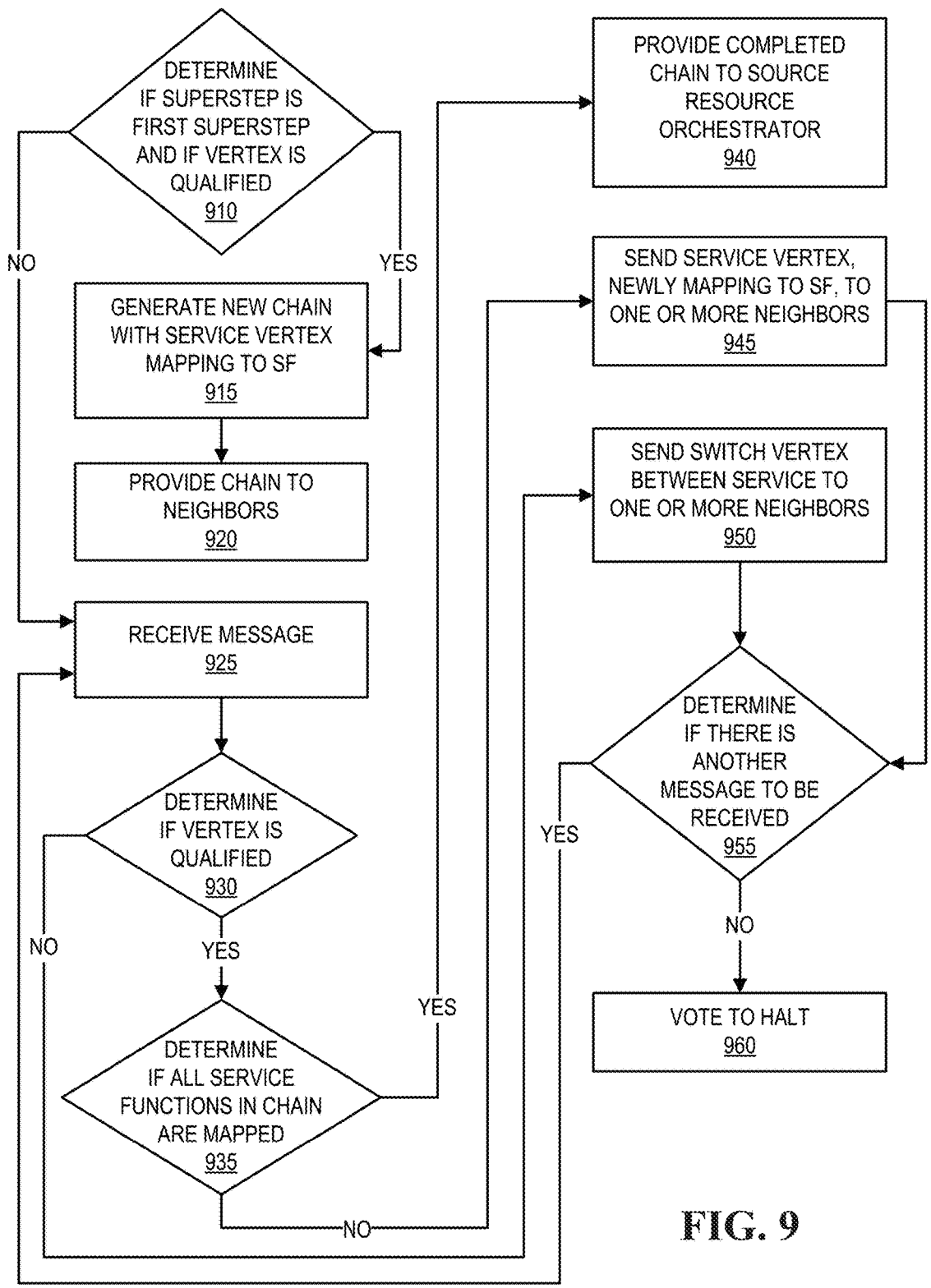
FIG. 9 illustrates a compute method that may be utilized via a vertex-centric distributed computing method, according to one or more embodiments.

Turning now to FIG. 9, a compute method that may be utilized via a vertex-centric distributed computing method is illustrated, according to one or more embodiments. At 910, it may be determined if a superstep is a first superstep and if a vertex is qualified. In one or more embodiments, a vertex is qualified if the vertex has an appropriate number of one or more VMs and has at least one SF of a SFC request. If the superstep is the first superstep and if the vertex is qualified, a new chain with the vertex (e.g., a service vertex) mapping to the first SF in the SFC is generated at 915. At 920, the chain, generated at 915, may be provided to one or more neighbors (e.g., neighbor vertices) of the vertex. In one or more embodiments, providing the chain to one or more neighbors of the vertex may include sending the chain to one or more neighbors of the vertex. If the superstep is not the first superstep or the vertex is not qualified, a message may be received at 925. For example, the message may include the chain provided at 920. For instance, the one or more neighbors of the vertex that provided the chain may receive the chain at 925. In one or more embodiments, the message may be instantiated via data structure 850.

At 930, it may be determined if a neighbor vertex is qualified. If the neighbor vertex is qualified, it may be determined if all service functions in the SFC request are mapped, at 935. If all service functions in the SFC request are mapped, a completed SFC may be provided to a source resource orchestrator, at 940. In one or more embodiments, providing the completed SFC to the source resource orchestrator may include emitting and/or sending the completed SFC to the source resource orchestrator.

If the all service functions in the SFC request are not mapped, the neighbor vertex (e.g., a service vertex), newly mapping to the SFC request, may be sent to one or more neighbors, at 945. In one or more embodiments, method elements that may be utilized in implementing method element 945 are described with reference to FIG. 10.

If the neighbor vertex is not qualified, the neighbor vertex (e.g., a switch vertex) may be sent to one or more neighbors, as a traversed switch vertex, at 950. In one or more embodiments, method elements that may be utilized in implementing method element 950 are described with reference to FIG. 11. At 955, it may be determined if there is another message to be received. If there is another message to be received, the method may proceed to 925, where the message may be received. If there in not another message to be received, a vote to halt may be emitted at 960.

In one or more embodiments, the method described with reference to FIG. 9 may be performed one or more times by multiple vertices in determining a SFC. For example, when a neighbor vertex provides a message to its one or more neighbors, each of the one or more neighbors may receive the message at 925 and proceed accordingly.

Figure 10:
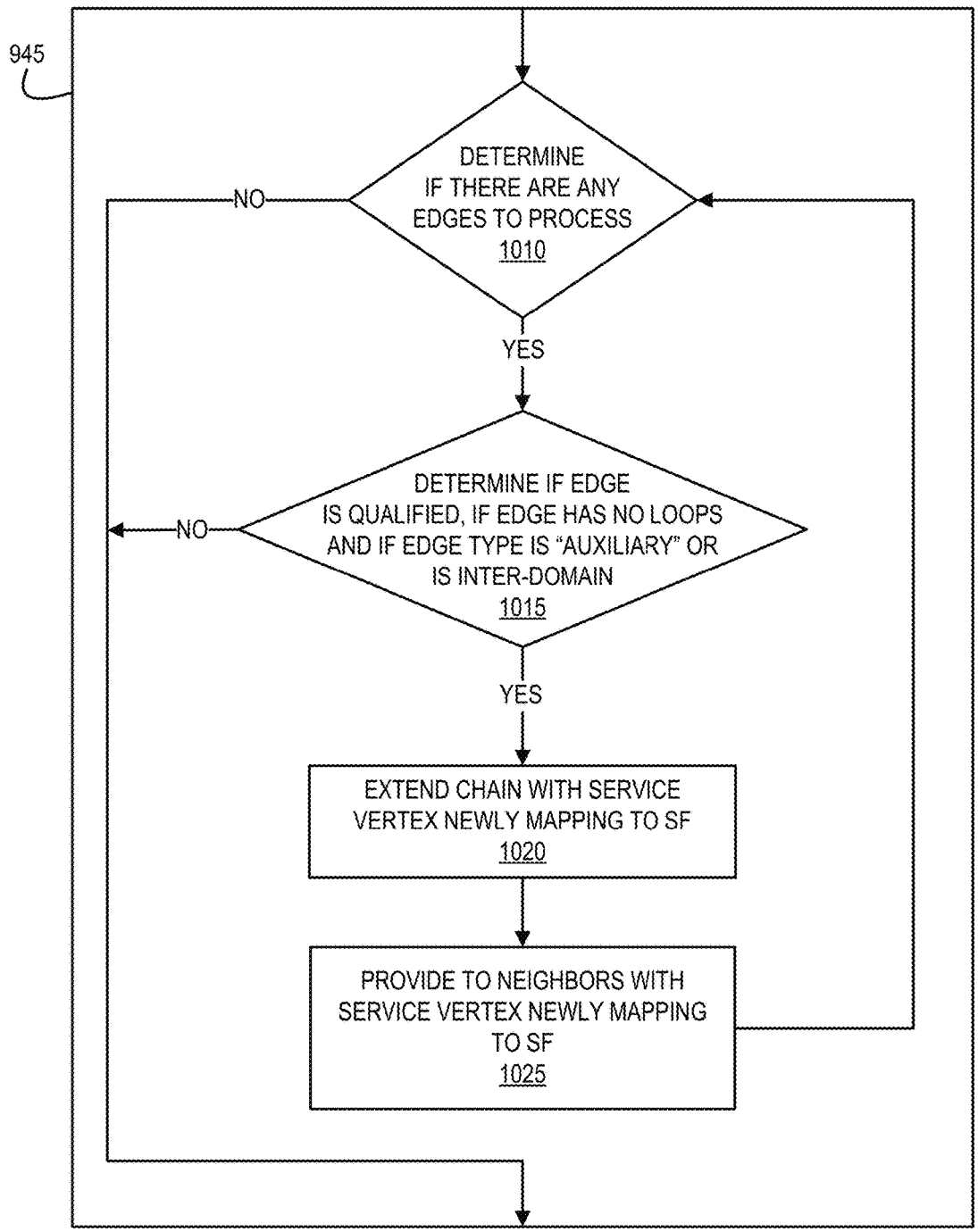
FIG. 10 illustrates a method of sending a service vertex to one or more neighbors, according to one or more embodiments.

Turning now to FIG. 10, a method of sending a service vertex to one or more neighbors utilizing auxiliary edges is illustrated, according to one or more embodiments. At 1010, it may be determined if there are any edges to process. If there are no edges to process, the method may proceed to 955, illustrated in FIG. 9. If there are edges to process, it may be determined if an edge is qualified, if the edge has no loops, and if an edge type is "auxiliary" or is "inter-domain", at 1015. If the edge is not qualified or if the has at least one loop or if the edge type is neither "auxiliary" nor "inter-domain", the method may proceed to 955, illustrated in FIG. 9. If the edge is qualified, if the edge has no loops, and if the edge type is "auxiliary" or is "inter-domain", the service chain may be extended with the neighbor vertex (e.g., a service vertex) mapping to the SF in the SFC, at 1020. At 1025, the chain with the neighbor vertex (e.g., a service vertex) mapping to the SF in the SFC may be provided to one or more neighbors (e.g., neighbor vertices) of the neighbor vertex.

In one or more embodiments, providing the chain to one or more neighbors of the neighbor vertex may include sending the chain to one or more neighbors of the neighbor vertex. In one example, if the neighbor vertex and one of the one or more neighbors vertices are stored via a resource orchestrator, then sending the chain to the one of the one or more neighbor vertices may include sending the chain via memory of the resource orchestrator. In another example, if the neighbor vertex and one of the one or more neighbors vertices are stored via different resource orchestrators, then sending the chain to the one of the one or more neighbor vertices may include sending the chain via one of communicative couplings 410 (illustrated in FIG. 4). In one or more embodiments, providing the chain to one or more neighbors of the neighbor vertex may include sending a message, instantiated via data structure 850, that includes the chain to one or more neighbors of the neighbor vertex. For example, mapped chain 864 of data structure 850 may include the chain.

Figure 11:
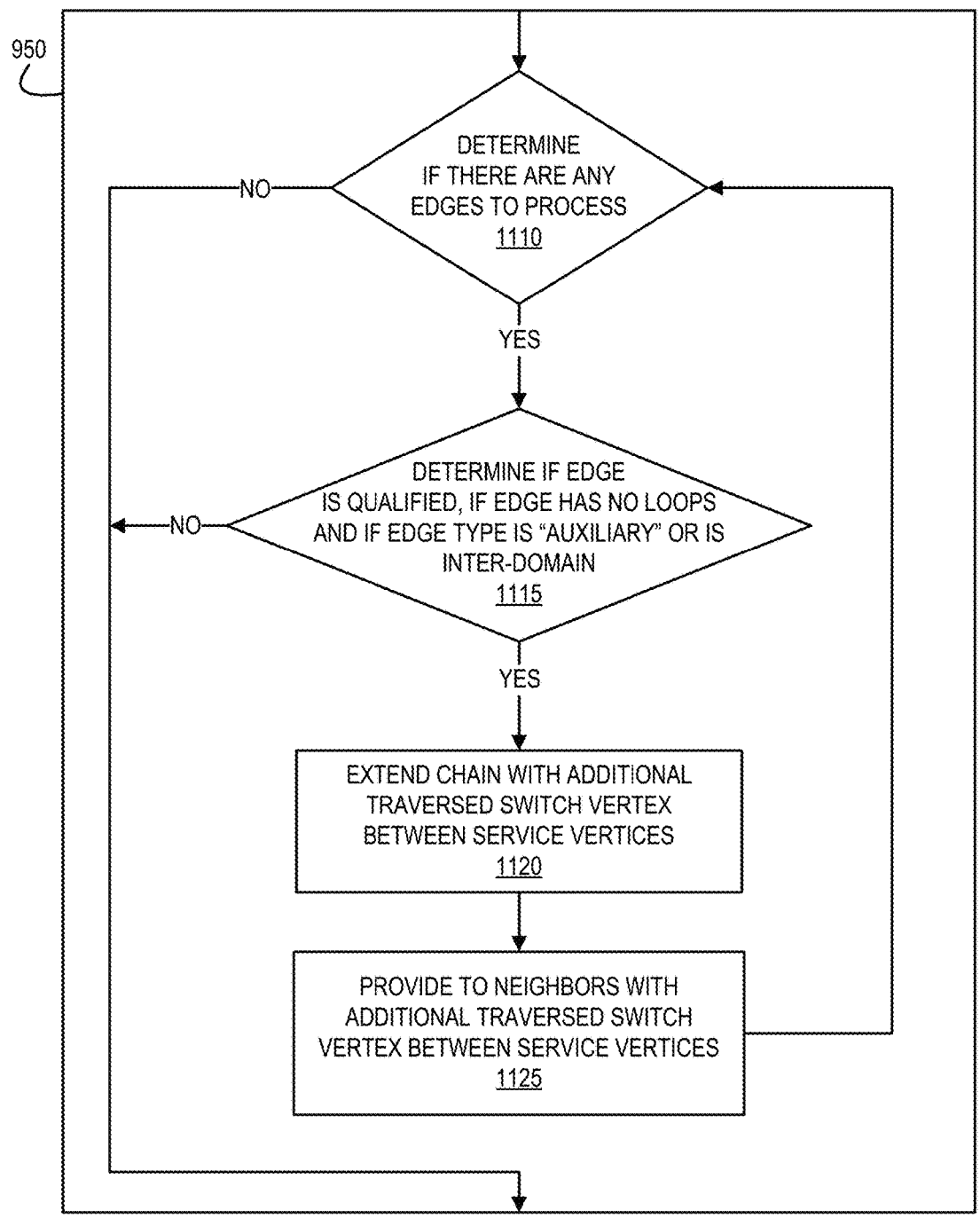
FIG. 11 illustrates a method of sending a switch vertex to one or more neighbors, according to one or more embodiments.

Turning now to FIG. 11, a method of sending a switch vertex to one or more neighbors is illustrated, according to one or more embodiments. At 1110, it may be determined if there are any edges to process. If there are no edges to process, the method may proceed to 955, illustrated in FIG. 9. If there are edges to process, it may be determined if there are edges to process, it may be determined if an edge is qualified, if the edge has no loops, and if an edge type is "auxiliary" or is "inter-domain", at 1115. If the edge is not qualified, if the has at least one loop, or if the edge type is neither "auxiliary" nor is "inter-domain", the method may proceed to 955, illustrated in FIG. 9. If the edge is qualified, if the edge has no loops, and if the edge type is "auxiliary" or is "inter-domain", the service chain may be extended with the neighbor vertex as an additional switch vertex between service vertices, at 1120. At 1125, the chain with the neighbor vertex (e.g., a switch vertex) may be provided to one or more neighbors (e.g., neighbor vertices) of the neighbor vertex.

In one or more embodiments, providing the chain to one or more neighbors of the neighbor vertex may include sending the chain to one or more neighbors of the neighbor vertex. In one example, if the neighbor vertex and one of the one or more neighbors vertices are stored via a resource orchestrator, then sending the chain to the one of the one or more neighbor vertices may include sending the chain via memory of the resource orchestrator. In another example, if the neighbor vertex and one of the one or more neighbors vertices are stored via different resource orchestrators, then sending the chain to the one of the one or more neighbor vertices may include sending the chain via one of communicative couplings 410 (illustrated in FIG. 4). In one or more embodiments, providing the chain to one or more neighbors of the neighbor vertex may include sending a message, instantiated via data structure 850, that includes the chain to one or more neighbors of the neighbor vertex. For example, mapped chain 864 of data structure 850 may include the chain.

Figure 12:
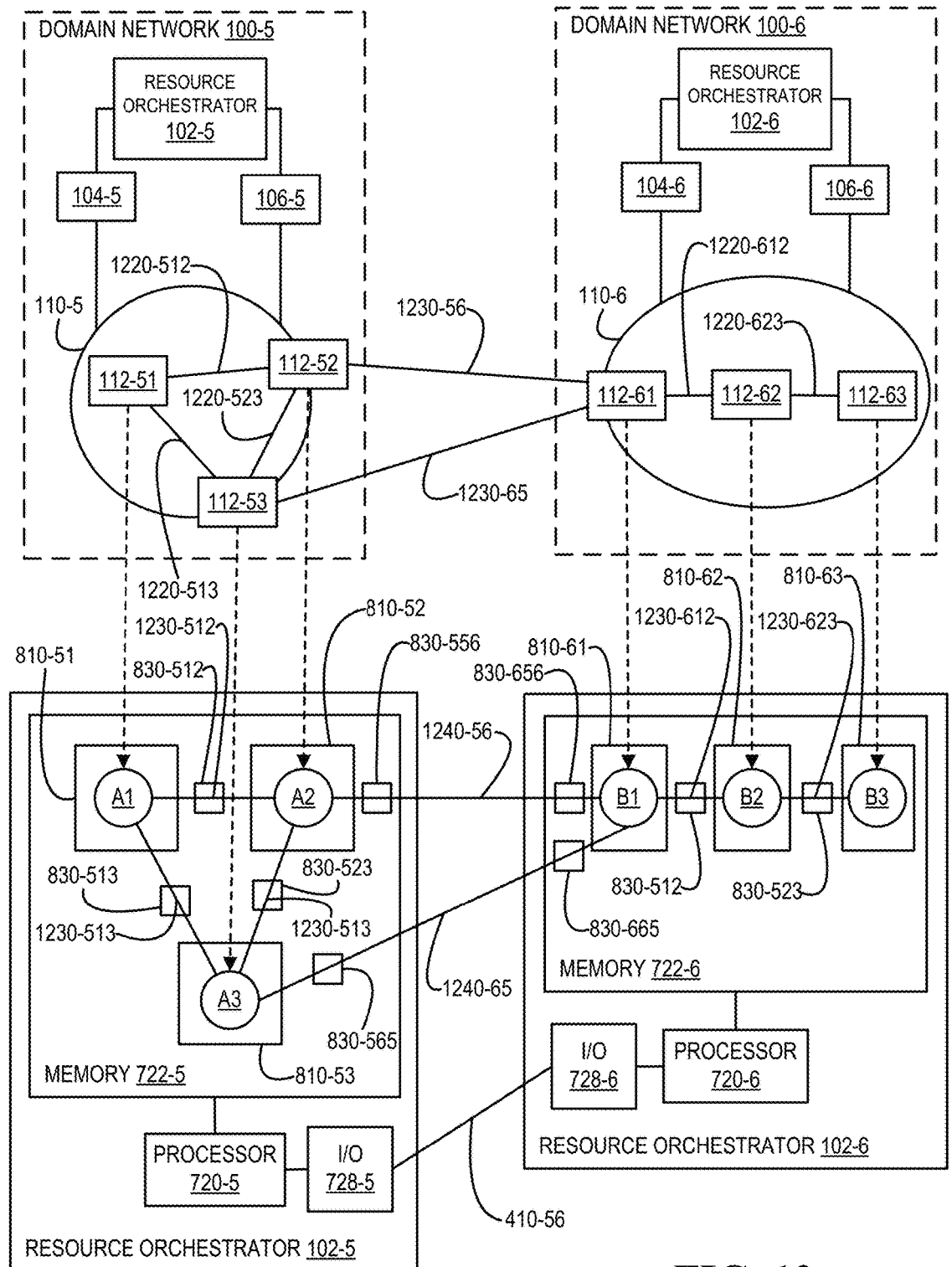
FIG. 12 provides an exemplary a mapping of network domains to vertices and edges, according to one or more embodiments.

Turning now to FIG. 12, a mapping of network domains to vertices and edges is illustrated, according to one or more embodiments. As shown, a network domain 100-5 may include a resource orchestrator 102-5, a SDN controller 104-5, a NFV manager 106-5, and a physical network 110-5. As illustrated, physical network 110-5 may include NEs (e.g., physical nodes) 112-51 through 112-53, where NEs 112-51 and 112-52 are coupled via communications coupling 1220-512, where NEs 112-51 and 112-53 are coupled via communications coupling 1220-513, and where NEs 112-52 and 112-53 are coupled via communications coupling 1220-523.

As shown, a network domain 100-6 may include a resource orchestrator 102-6, a SDN controller 104-6, a NFV manager 106-6, and a physical network 110-6. As illustrated, physical network 110-6 may include NEs (e.g., physical nodes) 112-61 through 112-63, where NEs 112-61 and 112-62 are coupled via communications coupling 1220-612, and where NEs 112-62 and 112-63 are coupled via communications coupling 1220-623. In one or more embodiments, network domains 100-5 and 100-6 may be coupled via communications couplings 1230-56 and 1230-65. As shown, NE 112-52 of network domain 100-5 and NE 112-61 of network domain 100-6 may be coupled via communications couplings 1230-56, and NE 112-53 of network domain 100-5 and NE 112-61 of network domain 100-6 may be coupled via communications couplings 1230-65.

As illustrated, NEs (physical nodes) 111-51 through 111-53 may be respectively mapped and/or represented via vertices A1 through A3, where vertices A1 through A3 may be respectively stored via data structures 810-51 through 810-53 via a memory 722-5 of resource orchestrator 102-5, and communication couplings 1220-512, 1220-513, and 1220-523 may be respectively mapped and/or represented via edges 1230-512, 1230-513, and 1230-523, where edges 1230-512, 1230-513, and 1230-523 may be respectively stored via data structures 830-512, 830-513, and 830-523 via memory 722-5. As shown, NEs (physical nodes) 111-61 through 111-63 may be respectively mapped and/or represented via vertices B1 through B3, where vertices B1 through B3 may be respectively stored via data structures 810-61 through 810-63 via a memory 722-6 of resource orchestrator 102-6, and communication couplings 1220-612 and 1220-623 may be respectively mapped and/or represented via edges 1230-612 and 1230-623, where edges 1230-612 and 1230-623 may be respectively stored via data structures 830-612 and 830-623 via memory 722-6. As illustrated, communication couplings 1230-56 and 1230-65 may be respectively mapped and/or represented via edges 1240-56 and 1240-65, where edges 1240-56 and 1240-65 may be respectively stored via data structures 830-556 and 830-565 via memory 722-5 and where edges 1240-56 and 1240-65 may be respectively stored via data structures 830-656 and 830-665 via memory 722-6.

In one or more embodiments, resource orchestrators 102-5 and 102-6 may communicate via a communications coupling 410-56. In one example, a processor 720-5 of resource orchestrator 102-5 may utilize an I/O subsystem 728-5 of resource orchestrator 102-5 to send one or more messages to resource orchestrator 102-6 via communications coupling 410-56, and a processor 722-6 of resource orchestrator 102-6 may utilize an I/O subsystem 728-6 of resource orchestrator 102-6 to receive the one or more messages. In another example, processor 720-6 6 may utilize 6 I/O subsystem 728-6 6 to send one or more messages to resource orchestrator 102-5 via communications coupling 410-56, and processor 722-5 may utilize I/O subsystem 728-5 to receive the one or more messages. In one embodiment, communications coupling 410-56 may be implemented via one or more of communications couplings 1230-56 and 1230-65, among others.

Turning now to FIGS. 13A-13F, exemplary diagrams of vertex-centric distributed computing of generating one or more candidate solutions for a SFC request are illustrated, according to one or more embodiments. More specifically, the exemplary diagrams depict a vertex-centric distributed computing example of a fixed order SFC request $f_1 \cdot f_2 \cdot f_3$ associated with a request identification of "1". In one or more embodiments, a data flow among the service functions may include $f_1$ receiving data (e.g., data from storage, data from a NE, etc.) and processing the received data, $f_2$ receiving the data processed via $f_1$ from $f_1$ and processing the data processed via $f_1$, $f_3$ receiving the data processed via $f_2$ from $f_2$ and processing the data processed via $f_2$, and $f_3$ providing output data to a data consumer. In this vertex-centric distributed computing example, it may be assumed that if a vertex includes a service function that satisfies the SFC request, the vertex includes the resources to implement the service function. As such, a resources portion 826 of a vertex data structure 810 is omitted in these diagrams.

Figure 13A:
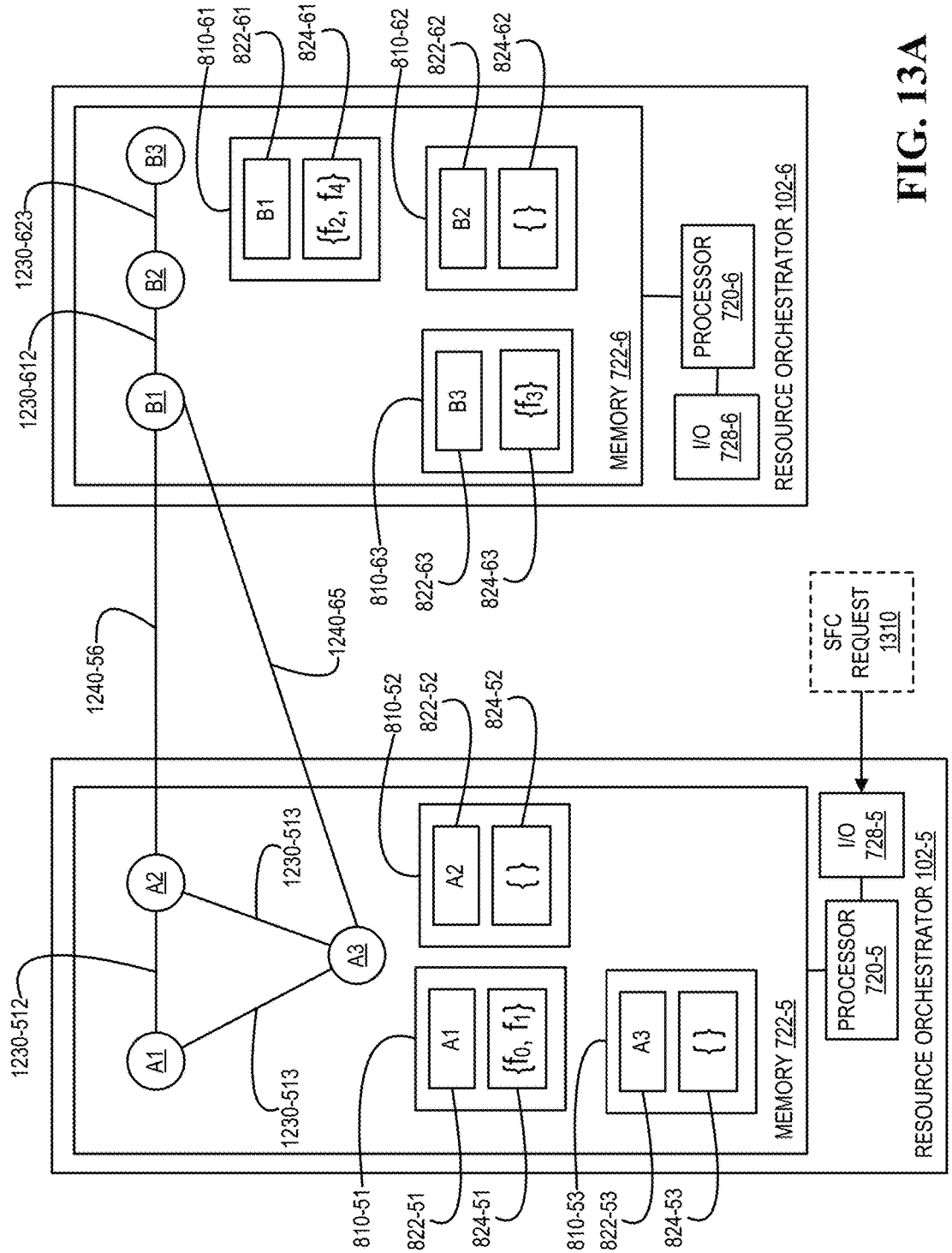
FIGS. 13A-13F provide exemplary diagrams of vertex-centric distributed computing of generating one or more candidate solutions for a service function chain request, according to one or more embodiments.

As illustrated, referring now to FIG. 13A, vertex data structure 810-51 may include a vertexID 822-51 that includes an identification "A1" that is associated with vertex A1 and may include a SF set 822-51 that includes $\{f_0, f_1\}$; vertex data structure 810-52 may include a vertexID 822-52 that includes an identification "A2" that is associated with vertex A2 and may include a SF set 822-52 that includes { } (e.g., an empty set that may indicate that the vertex includes no functions applicable to a SFC request); and vertex data structure 810-53 may include a vertexID 822-53 that includes an identification "A3" that is associated with vertex A3 and may include a SF set 822-53 that includes { } (e.g., an empty set that may indicate that the vertex includes no functions applicable to a SFC request). As shown, vertex data structure 810-61 may include a vertexID 822-61 that includes an identification "B1" that is associated with vertex B1 and may include a SF set 822-61 that includes $\{f_2, f_4\}$; vertex data structure 810-62 may include a vertexID 822-62 that includes an identification "B2" that is associated with vertex B2 and may include a SF set 822-62 that includes { } (e.g., an empty set that may indicate that the vertex includes no functions applicable to a SFC request); and vertex data structure 810-63 may include a vertexID 822-63 that includes an identification "B3" that is associated with vertex B3 and may include a SF set 822-63 that includes $\{f_3\}$.

As illustrated, resource orchestrator 102-5 may receive a SFC request 1310 that includes a fixed order SFC request $f_1 \cdot f_2 \cdot f_3$. For example, resource orchestrator 102-5 may receive SFC request 1310 via I/O subsystem 728-5. In one or more embodiments, resource orchestrator 102-5 may be and/or serve as a source resource orchestrator. For example, the source resource orchestrator may be and/or may be considered a master domain in a multi-network domain.

Figure 13B:
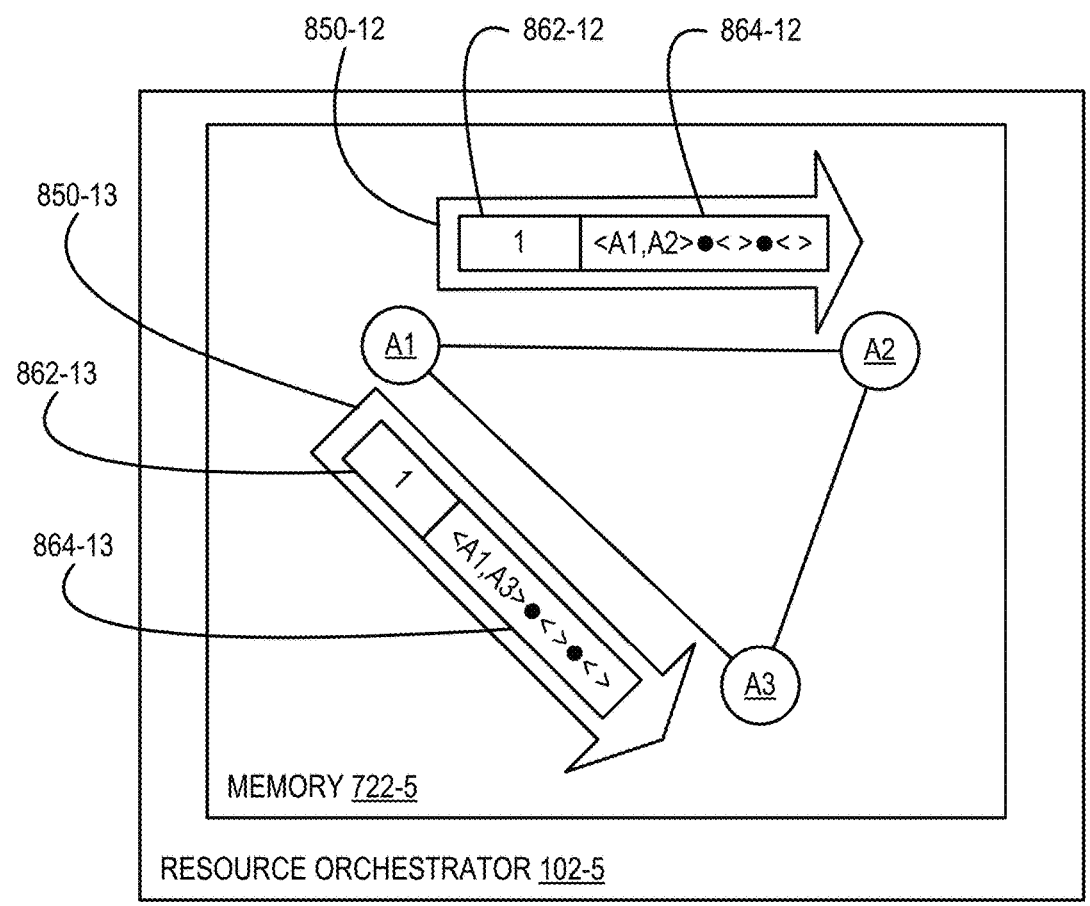

As shown, referring now to FIG. 13B, superstep 0 (e.g., a first iteration) may map vertex A1 to a candidate SFC, as vertex A1 is qualified since A1 includes service function and provide the candidate SFC to one or more neighbors of vertex A1. In one or more embodiments, providing the candidate SFC to a neighbor vertex may include extending the candidate SFC with the neighbor vertex. As illustrated, a mapped chain 864-12 may be provided to vertex A2 with a first path segment of mapped chain 864-12 extended with vertex A2, and a mapped chain 864-13 may be provided to vertex A3 with a first path segment of mapped chain 864-13 extended with vertex A3.

In one or more embodiments, mapped chains 864-12 and 864-13 may be or may include partially mapped chains. For example, the first path segment of mapped chain 864-12 may include <A1, A2>, and the first path segment of mapped chain 864-13 may include <A1, A3>. For instance, a second path segment and a third path segment of mapped chains 864-12 and 864-13 may include < >, as those path segments are yet to be mapped. As shown, superstep 0 may provide mapped chains 864-12 and 864-13, via respective messages 850-12 and 850-13, to vertices A2 and A3, respectively.

Figure 13C:
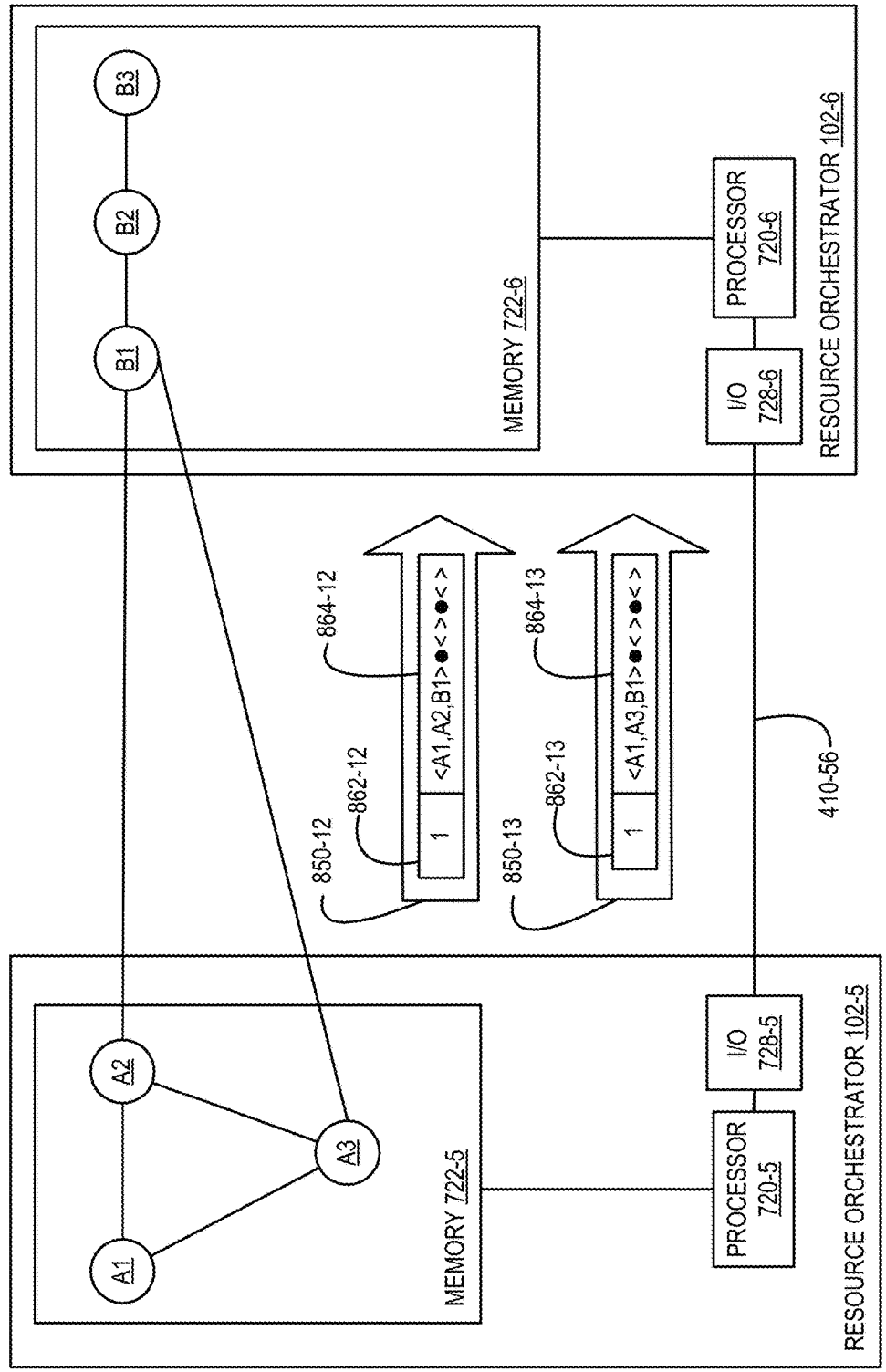

As illustrated, referring now to FIG. 13C, superstep 1 (e.g., a second iteration) may map vertices A2 and A3 to respective mapped chains 864-1256 and 864-1356, as vertices A2 and A3 may be switch vertices, and superstep 1 may provide mapped chains 864-12 and 864-13 to vertex B1. In providing mapped chains 864-12 and 864-13 to vertex B1, the first path segment of each of mapped chains 864-12 and 864-13 may be extended with vertex B1, as shown.

In one or more embodiments, resource orchestrator 102-5 may provide messages 850-12 and 850-13, that respectively include mapped chains 864-12 and 864-13, to resource orchestrator 102-6. For example, resource orchestrator 102-5 may provide messages 850-12 and 850-13 to resource orchestrator 102-6 via communications coupling 410-56. For instance, communications coupling 410-56 may be or include a control channel. In one or more embodiments, messages 850-12 and 850-13 may be provided via a single message.

Figure 13D:
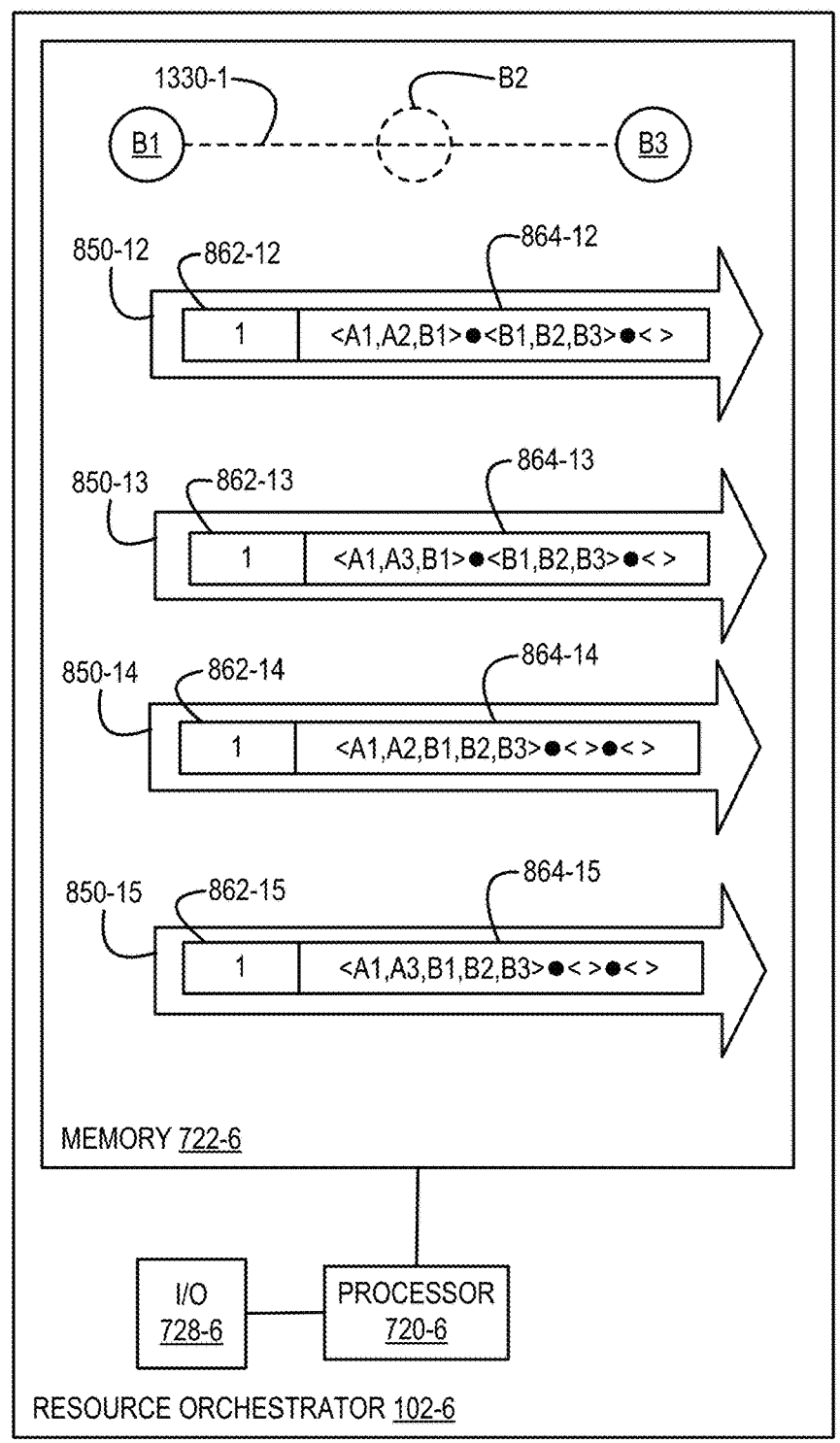

As shown, referring now to FIG. 13D, superstep 2 (e.g., a third iteration) may map vertex B1 to mapped chains 864-12 and 864-13, as vertex B1 is qualified since B1 includes service function $f_2$. For example, superstep 2 may map vertex B1 to a second path segment of mapped chains 864-12 and 864-13. In one or more embodiments, an auxiliary edge 1330-1 may be utilized. For example, resource orchestrator 102-6 may store information associated with a topology and processing capabilities of nodes of physical network 110-6 and may determine economical and/or efficient paths between service vertices. For example, resource orchestrator 102-6 may store information that indicates that vertex B2 is not associated with a service function, and B2 may be eliminated from processing via a superstep. For instance, auxiliary edge 1330-1 may be utilized in place of B2 (e.g., signifying B2 as a dotted circle), permitting superstep 2 to utilize B3 as a neighbor of B1, instead of utilizing B2 as a neighbor of B1. In one or more embodiments, eliminating a vertex from processing via a superstep may improve efficiency and/or computation time (e.g., by reducing computation time) in determining a candidate SFC.

As illustrated, mapped chains 864-12 and 864-13 may be provided to vertex B3, and in providing mapped chains 864-12 and 864-13 to vertex B3, mapped chains 864-12 and 864-13 may be extended with neighbor vertices B2 and B3. In one or more embodiments, border vertices (e.g., vertices with inter-domain edges) may be service vertices and/or switch vertices. For example, vertex B1 may be a switch vertex as well as a service vertex. For instance, mapped chains 864-14 and 864-15 may be provided to vertex B3, and in providing mapped chains 864-14 and 864-15 to vertex B3, first path segments of mapped chains 864-14 and 864-15 may be extended with switch vertices B1 and B2 and neighbor vertex B3.

Figure 13E:
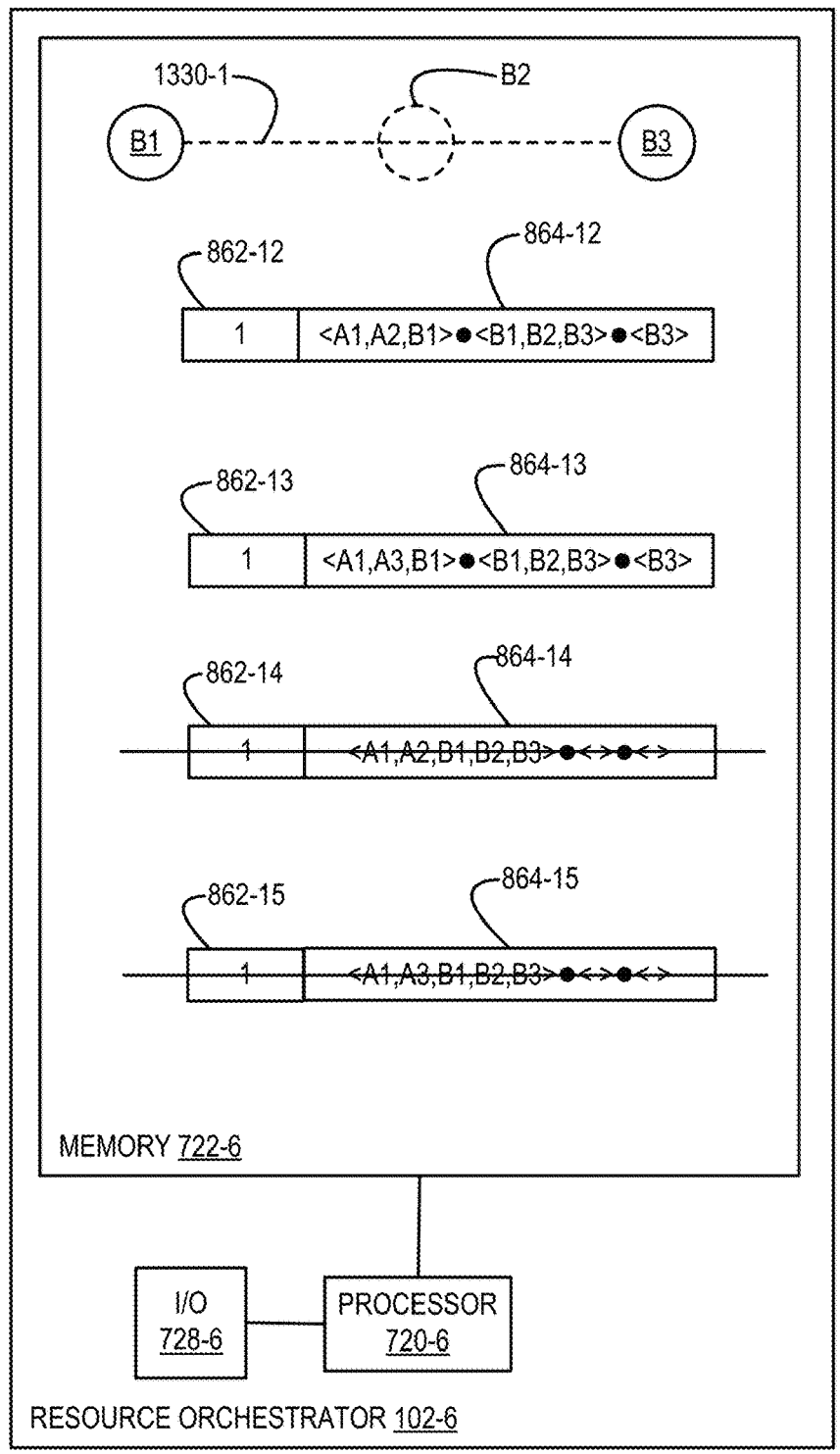

As shown, referring now to FIG. 13E, superstep 3 (e.g., a fourth iteration) may map vertex B3 to mapped chains 864-12 and 864-13, as vertex B3 is qualified since B3 includes service function $f_3$. As illustrated, mapped chains 864-14 and 864-15 may be eliminated as vertex B3 has no neighbor vertex to send mapped chains 864-14 and 864-15, and vertex B3 does not include $f_2$ as specified by respective second path segments of mapped chains 864-14 and 864-15.

Figure 13F:
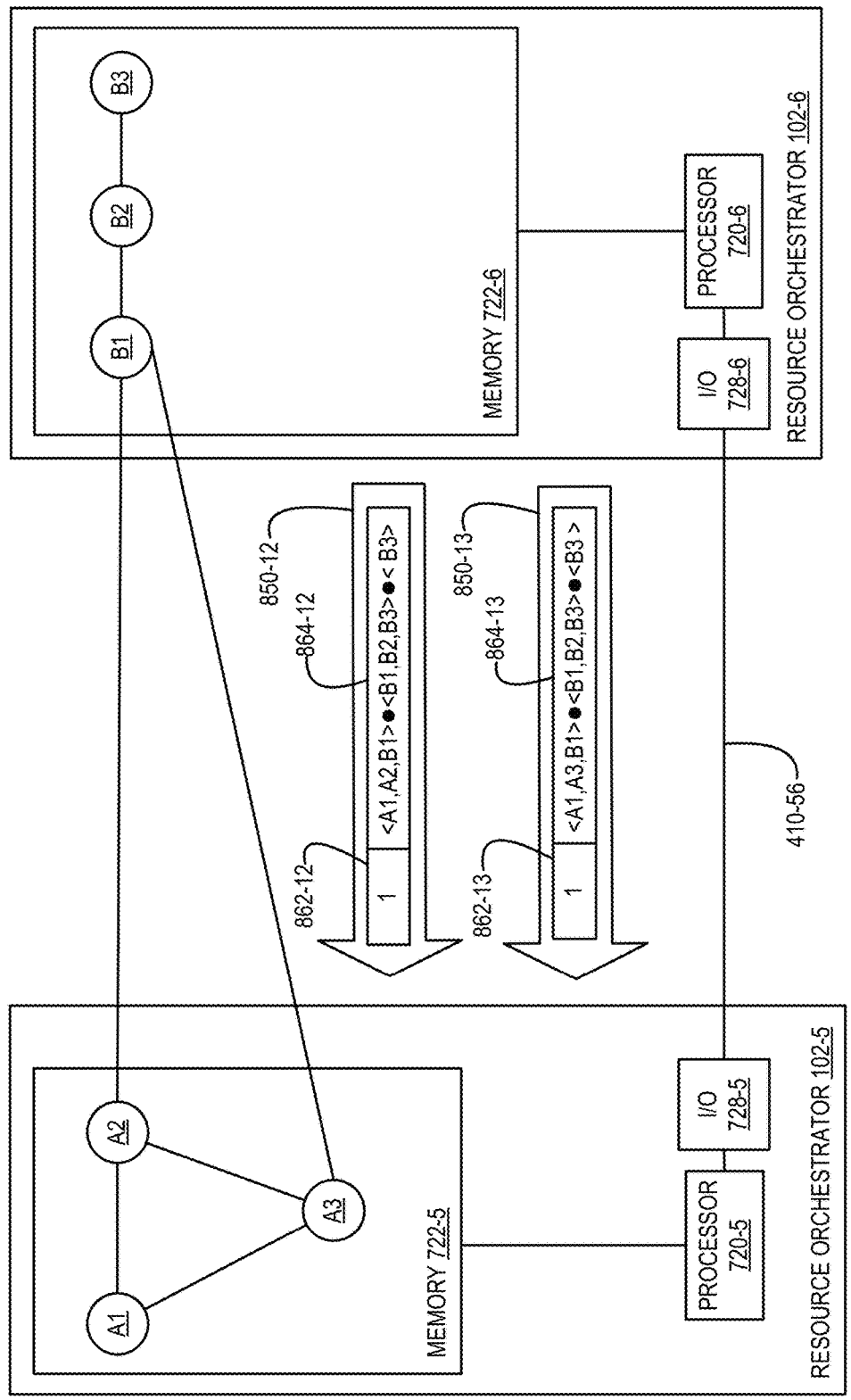

As illustrated, referring now to FIG. 13F, resource orchestrator 102-6 may provide mapped chains 864-12 and 864-13 to resource orchestrator 102-5 via messages 850-12 and 850-13. For example, resource orchestrator 102-6 may provide messages 850-12 and 850-13 to resource orchestrator 102-5 via communications coupling 410-56. For instance, communications coupling 410-56 may be or include a control channel. In one or more embodiments, messages 850-12 and 850-13 may be provided via a single message. In one or more embodiments, resource orchestrator 102-5 may be a source resource orchestrator that receives one or more candidate SFCs for SFC request 1310. For example, mapped chains 864-12 and 864-13 may be candidate SFCs for SFC request 1310.

Figure 14:
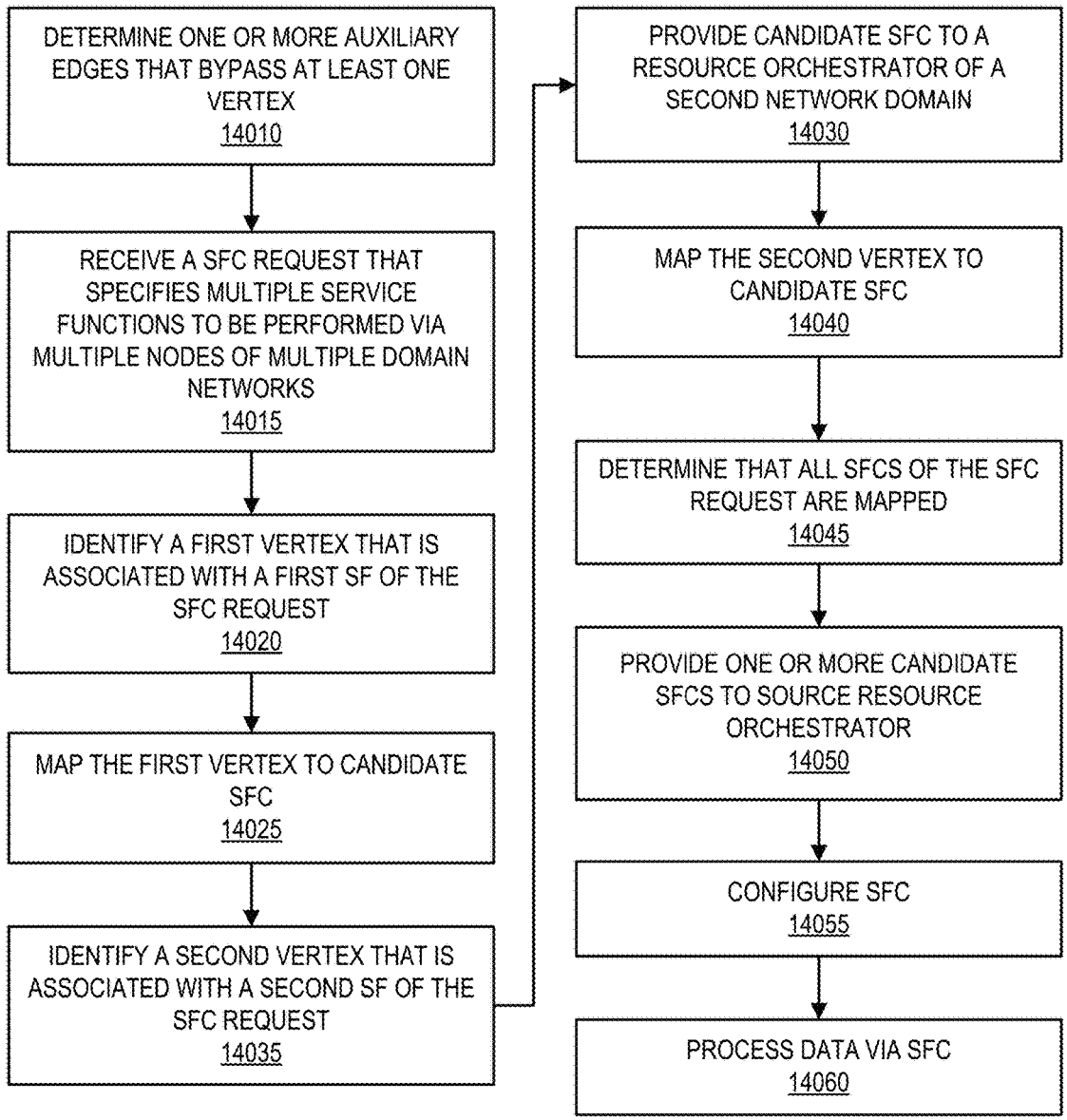
FIG. 14 illustrates a method of utilizing multiple network domains in determining a service function chain, according to one or more embodiments.

Turning now to FIG. 14, a method of utilizing multiple network domains in determining a service function chain is illustrated, according to one or more embodiments. At 14010, one or more auxiliary edges that bypass at least one vertex may be determined. In one or more embodiments, a resource orchestrator may store information associated with a topology and processing capabilities of nodes of a physical network associated with the resource orchestrator and may determine one or more economical and/or efficient paths between service vertices. For example, the resource orchestrator may store information that indicates that a vertex (associated with a respective node) is not associated with a service function, and the vertex may be eliminated from processing via a superstep. For instance, an auxiliary edge may be utilized in place of the vertex that is not associated with a service function, permitting a superstep to utilize another vertex as a neighbor, instead of utilizing the vertex that is not associated with a service function as the neighbor.

At 14015, a SFC request that specifies multiple SFs to be performed via multiple nodes of the multiple network domains. For example, a resource orchestrator may receive the SFC request. In one or more embodiments, the multiple nodes of the multiple network domains may be represented via multiple vertices. For example, the multiple vertices may be utilized via multiple resource orchestrators of the multiple network domains in determining one or more candidate SFCs.

At 14020, a first vertex, of the multiple vertices, that is associated with a first SF of the multiple SFs of the SFC request may be identified. For example, the first vertex that is associated with the first SF may be associated with a first node, of the multiple nodes, that may perform the first SF. At 14025, the first vertex may be mapped to a candidate SFC. In one or more embodiments, the first vertex may be mapped to a path segment of the candidate SFC. For example, the candidate SFC may be or include a partial mapping.

At 14030, the candidate SFC may be provided to a resource orchestrator of a second network domain of the multiple network domains. For example, the resource orchestrator that received the SFC request may be a first resource orchestrator of a first network domain, and the resource orchestrator of the second network domain may be different from the first resource orchestrator of the first network domain.

At 14035, a second vertex, of the multiple vertices, that is associated with a second SF of the multiple SFs of the SFC request may be identified. For example, the second vertex that is associated with the second SF may be associated with a second node, of the multiple nodes, that may perform the second SF. In one or more embodiments, the resource orchestrator of the second network domain may identify the second vertex that is associated with the second SF.

At 14040, the second vertex may be mapped to the candidate SFC. In one or more embodiments, the second vertex may be mapped to a path segment of the candidate SFC. In one example, the second vertex may be mapped to a path segment of the candidate SFC that is different from the path segment that the first vertex was mapped. In another example, the second vertex may be mapped to a path segment of the candidate SFC that is the same the path segment that the first vertex was mapped. For instance, the second vertex may be or include a service vertex and a switch vertex.

At 14045, it may be determined that all SFCs of the SFC request are mapped. In one or more embodiments, determining that all SFCs of the SFC request are mapped may include determining that a superstep in each network domain may not be able to provide messages to another vertex of the network domain. At 14050, one or more candidate SFCs may be provided to the resource orchestrator of the first network domain. In one or more embodiments, the resource orchestrator of the first network domain may be a source resource orchestrator.

At 14055, a SFC may be configured. For example, the SFC may be configured via a candidate SFC of the one or more candidate SFCs that were provided to the resource orchestrator. In one or more embodiments, the SFC may be configured via the multiple network domains. In one example, configuring the SFC may include allocating resources in multiple network domains. For instance, one or more VMs may be allocated in the multiple network domains to provide the SFC. In another example, configuring the SFC may include configuring resources in multiple network domains. For instance, one or more network elements may be configured in the multiple network domains to provide the SFC. In one or more embodiments, the one or more network elements may include one or more switching and/or routing elements that may be configured in the multiple network domains to provide the SFC. For example, one or more SDN controllers may configure the one or more network elements to provide the SFC. At 14060, data may be processed via the SFC.

Figure 15:
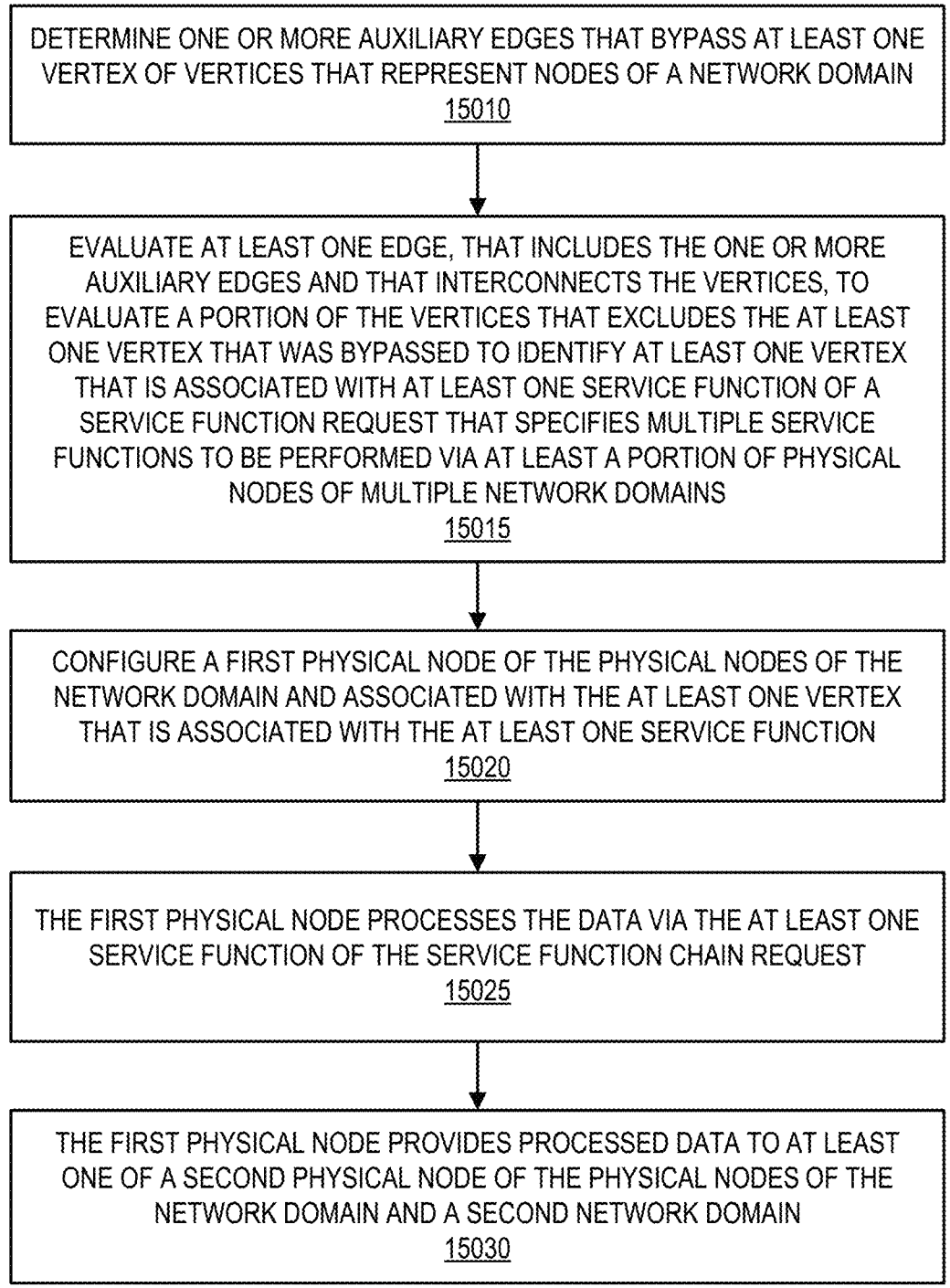
FIG. 15 illustrates a method of utilizing a network domain, according to one or more embodiments.

Turning now to FIG. 15, a method of utilizing a network domain is illustrated, according to one or more embodiments. At 15010, one or more auxiliary edges that bypass at least one vertex, of vertices that represent physical nodes of the network domain, may be determined. In one or more embodiments, a resource orchestrator of the network domain may store information associated with a topology and processing capabilities of physical nodes of a physical network associated with the resource orchestrator and may determine one or more economical and/or efficient paths between service vertices. For example, the resource orchestrator may store information that indicates that a vertex (associated with a respective node) is not associated with a service function, and the vertex may be eliminated from processing via a superstep. For instance, an auxiliary edge may be utilized in place of the vertex that is not associated with a service function, permitting a superstep to utilize another vertex as a neighbor, instead of utilizing the vertex that is not associated with a service function as the neighbor.

At 15015, at least one edge (e.g., one or more edges), that includes the one or more auxiliary edges and that interconnect the vertices, may be evaluated to evaluate a portion of the vertices that excludes the at least one vertex that was bypassed to identify at least one vertex that is associated with at least one service function of a service function chain request that specifies multiple service functions to be performed via at least a portion of physical nodes of multiple network domains. At 15020, a first physical node, of the physical nodes of the network domain and associated with the at least one vertex that is associated with the at least one service function, may be configured to process data via the at least one service function of the service function chain request.

At 15025, the first physical node may process the data via the at least one service function of the service function chain request. At 15030, the first physical node may provide processed data to at least one of a second physical node of the physical nodes of the network domain and a second network domain.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of determining a service function chain across a plurality of network domains, the method comprising:
   determining one or more auxiliary edges that bypass at least one vertex of a plurality of vertices that represent a plurality of physical nodes of a first network domain of the plurality of network domains;
   evaluating at least one edge, that includes the one or more auxiliary edges and that interconnect the plurality of vertices, to evaluate a portion of the plurality of vertices that excludes the at least one vertex that was bypassed to identify at least one vertex that is associated with at least one service function of a service function chain request that specifies multiple service functions to be performed via at least a portion of a plurality of physical nodes of a plurality of network domains, wherein the portion of the plurality of vertices includes at least one vertex of a second network domain;
   configuring a first physical node of the plurality of physical nodes of the first network domain and associated with the at least one vertex that is associated with the at least one service function to process data via the at least one service function of the service function chain request, the first physical node processing the data via the at least one service function of the service function chain request; and
   providing processed data to at least one of a second physical node of the second network domain.

2. The method of claim 1, further comprising: a third physical node of the plurality of physical nodes of the first network domain, associated with the at least one vertex that was bypassed, transferring at least one of the data and the processed data.

3. The method of claim 1, further comprising:
   mapping, to a candidate service function chain, the at least one vertex that is associated with at least one service function of the service function chain request and the at least one vertex that was bypassed.

4. The method of claim 3, further comprising:
   determining that all service functions of the service function chain request are mapped; and
   providing the candidate service function chain to a resource orchestrator.

5. The method of claim 3, further comprising:
   completing the candidate service function chain, wherein the candidate service function chain includes a first mapping of vertices that include the at least one vertex that is associated with the at least one service function; and
   completing a second candidate service function chain, wherein the second candidate service function chain includes a second mapping of vertices that include at least one vertex, wherein the second mapping of vertices is different from the first mapping of vertices.

6. The method of claim 5, further comprising:
   selecting, from the candidate service function chain and the second candidate service function chain, a service function chain solution based on at least one of a service provider policy, a service provider constraint, and a requestor on whose behalf the service function chain request was received, a bandwidth value, a distance value, a number of nodes, and delay information.

7. The method of claim 1, wherein the service function chain request specifies a flexible ordering for the multiple service functions to be performed;
   the method further comprising:
   mapping, to a first candidate service function chain and to a first service function position of the first candidate service function chain, the at least one vertex that is associated with at least one service function of the service function chain request; and
   mapping, to a second candidate service function chain and to a second service function position of the second candidate service function chain, the at least one vertex that is associated with at least one service function of the service function chain request, wherein the second service function position is different from the first service function position.

8. A system that determines a service function chain across a plurality of network domains, comprising:
   a processor; and
   a memory, communicatively coupled to the processor, that stores processor-executable instructions;
   wherein, when the processor-executable instructions are executed by the processor, the system:
   determines one or more auxiliary edges that bypass at least one vertex of a plurality of vertices that represent a plurality of physical nodes of a first network domain of the plurality of network domains;
   evaluates at least one edge, that includes the one or more auxiliary edges and that interconnect the plurality of vertices, to evaluate a portion of the plurality of vertices that excludes the at least one vertex that was bypassed to identify at least one vertex that is associated with at least one service function of a service function chain request that specifies multiple service functions to be performed via at least a portion of a plurality of physical nodes of a plurality of network domains, wherein the portion of the plurality of vertices includes at least one vertex of a second network domain; and
   configures a first physical node of the plurality of physical nodes of the network domain and associated with the at least one vertex that is associated with the at least one service function to process data via the at least one service function of the service function chain request, the first physical node processing the data via the at least one service function of the service function chain request; and
   provides processed data to at least one of a second physical node of the second network domain.

9. The system of claim 8, wherein the memory stores further processor-executable instructions that when executed by the processor, the system:
   maps, to a candidate service function chain, the at least one vertex that is associated with at least one service function of the service function chain request and the at least one vertex that was bypassed.

10. The system of claim 9, wherein the memory stores further processor-executable instructions that when executed by the processor, the system:
    determines that all service functions of the service function chain request are mapped; and
    provides the candidate service function chain to a resource orchestrator.

11. The system of claim 9, wherein the memory stores further processor-executable instructions that when executed by the processor, the system:

completes the candidate service function chain, wherein the candidate service function chain includes a first mapping of vertices that include the at least one vertex that is associated with the at least one service function; and completes a second candidate service function chain, wherein the second candidate service function chain includes a second mapping of vertices that include at least one vertex, wherein the second mapping of vertices is different from the first mapping of vertices.

12. The system of claim 11, wherein the memory stores further processor-executable instructions that when executed by the processor, the system:

selects, from the candidate service function chain and the second candidate service function chain, a service function chain solution based on at least one of a service provider policy, a service provider constraint, and a requestor on whose behalf the service function chain request was received, a bandwidth value, a distance value, a number of modes, and delay information.

13. The system of claim 8, wherein the service function chain request specifies a flexible ordering for the multiple service functions to be performed; and wherein the memory stores further processor-executable instructions that when executed by the processor, the system:

maps, to a first candidate service function chain and to a first service function position of the first candidate service function chain, the at least one vertex that is associated with at least one service function of the service function chain request; and maps, to a second candidate service function chain and to a second service function position of the second candidate service function chain, the at least one vertex that is associated with at least one service function of the service function chain request, wherein the second service function position is different from the first service function position.

14. A non-transitory computer readable memory device that stores processor-executable instructions for determining a service function chain across a plurality of network domains, that when executed by a processor, the processor:

determines one or more auxiliary edges that bypass at least one vertex of a plurality of vertices that represent a plurality of physical nodes of a first network domain of the plurality of network domains;

evaluates at least one edge, that includes the one or more auxiliary edges and that interconnect the plurality of vertices, to evaluate a portion of the plurality of vertices that excludes the at least one vertex that was bypassed to identify at least one vertex that is associated with at least one service function of a service function chain request that specifies multiple service functions to be performed via at least a portion of a plurality of physical nodes of a plurality of network domains, wherein the portion of the plurality of vertices includes at least one vertex of a second network domain;

configures a first physical node of the plurality of physical nodes of the network domain and associated with the at least one vertex that is associated with the at least one service function to process data via the at least one service function of the service function chain request, the first physical node processing the data via the at least one service function of the service function chain request; and provides processed data to at least one of a second physical node of the second network domain.

15. The non-transitory computer readable memory device of claim 14, wherein the memory device stores further processor-executable instructions, that when executed by the processor, the processor:

maps, to a candidate service function chain, the at least one vertex that is associated with at least one service function of the service function chain request and the at least one vertex that was bypassed.

16. The non-transitory computer readable memory device of claim 15, wherein the memory device stores further processor-executable instructions, that when executed by the processor, the processor:

determines that all service functions of the service function chain request are mapped; and provides the candidate service function chain to a resource orchestrator.

17. The non-transitory computer readable memory device of claim 15, wherein the memory device stores further processor-executable instructions, that when executed by the processor, the processor:

completes the candidate service function chain, wherein the candidate service function chain includes a first mapping of vertices that include the at least one vertex that is associated with the at least one service function; and completes a second candidate service function chain, wherein the second candidate service function chain includes a second mapping of vertices that include at least one vertex, wherein the second mapping of vertices is different from the first mapping of vertices.

* * * * *